United States Patent [19]

Iwasaki et al.

[11] Patent Number: 5,639,581
[45] Date of Patent: Jun. 17, 1997

[54] CHARGE TRANSPORTING POLYMER, PROCESS FOR PRODUCING THE SAME, AND ORGANIC ELECTRONIC DEVICE CONTAINING THE SAME

[75] Inventors: Masahiro Iwasaki; Akira Imai; Katsumi Nukada; Katsuhiro Sato, all of Minami-ashigara, Japan

[73] Assignee: Fuji Xerox Co., Ltd., Tokyo, Japan

[21] Appl. No.: 543,913

[22] Filed: Oct. 17, 1995

[30] Foreign Application Priority Data

Oct. 24, 1994 [JP] Japan .................. 6-282485

[51] Int. Cl.$^6$ .................................. G03G 5/047
[52] U.S. Cl. .................................. 430/59; 430/77
[58] Field of Search .................. 430/58, 59, 96, 430/77

[56] References Cited

U.S. PATENT DOCUMENTS

| | | | |
|---|---|---|---|
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,937,165 | 6/1990 | Ong et al. | 430/59 |
| 4,959,288 | 9/1990 | Ong et al. | 430/59 |
| 4,983,482 | 1/1991 | Ong et al. | 430/59 |
| 5,034,296 | 7/1991 | Ong et al. | 430/59 |
| 5,409,792 | 4/1995 | Yanus et al. | 430/59 |
| 5,436,099 | 7/1995 | Schank et al. | 430/59 |

FOREIGN PATENT DOCUMENTS

| | | |
|---|---|---|
| 295 113 | 12/1988 | European Pat. Off. . |
| 550 161 | 7/1993 | European Pat. Off. . |
| 53-87226 | 8/1978 | Japan . |
| 59-28903 | 7/1984 | Japan . |
| 61-20953 | 1/1986 | Japan . |
| 1-134456 | 5/1989 | Japan . |
| 1-134457 | 5/1989 | Japan . |
| 1-134462 | 5/1989 | Japan . |
| 4-133065 | 5/1992 | Japan . |
| 4-133066 | 5/1992 | Japan . |
| 4-189873 | 7/1992 | Japan . |
| 5-43813 | 2/1993 | Japan . |
| 5-98181 | 4/1993 | Japan . |
| 5-140472 | 6/1993 | Japan . |
| 5-140473 | 6/1993 | Japan . |
| 5-232727 | 9/1993 | Japan . |
| 5-279591 | 10/1993 | Japan . |
| 5-263007 | 10/1993 | Japan . |

OTHER PUBLICATIONS

Murti et al., "Charge Transport Polymers Based on Triphenylamine and Tetraphenylbenzidine Moieties", from the proceedings of *The Sixth International Congress on Advances in Non-Impact Printing Technologies*, Oct. 21–26, 1990, pp. 306–311.

*Primary Examiner*—John Goodrow
*Attorney, Agent, or Firm*—Oliff & Berridge

[57] ABSTRACT

A charge transporting polymer represented by formula (I):

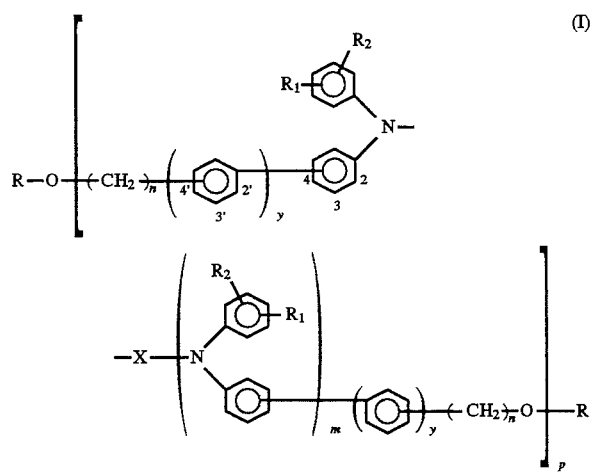

wherein R represents a hydrogen atom, an alkyl group, an acyl group or —CONH—R' wherein R' represents an alkyl group or a substituted or unsubstituted aryl group; $R_1$ and $R_2$, which may be the same or different, each represent a hydrogen atom, an alkyl group, an alkoxy group, a substituted amino group, a halogen atom, or a substituted or unsubstituted aryl group; X represents a substituted or unsubstituted divalent aromatic group; y represents 0 or 1; m represents 0 or 1; n represents an integer of 1 to 5; and p represents an integer of 5 to 5000, a process for producing the same, and an organic electron device containing the same, such as an electrophotographic photoreceptor are disclosed. The charge transporting polymer is excellent in solubility, film-forming properties, mechanical strength, positive hole mobility, and stability to repeated use.

2 Claims, 11 Drawing Sheets

CHARGE TRANSPORTING POLYMER, PROCESS FOR PRODUCING THE SAME, AND ORGANIC ELECTRONIC DEVICE CONTAINING THE SAME

FIELD OF THE INVENTION

This invention relates to a novel charge transporting polymer, a process for producing the same, and an organic electron device containing the same. More particularly it relates to an electrophotographic organic photoreceptor containing the novel charge transporting polymer.

BACKGROUND OF THE INVENTION

Charge transporting polymers typified by polyvinylcarbazole (PVK) are promising photoconductive materials for use as electrophotographic photoreceptors or, as reported in the proceedings of the 36th Meeting of Applied Physics Related Association, for use as organic electroluminescence device materials. These elements have a charge transporting layer, and well-known materials forming a charge transporting layer include charge transporting polymers typified by PVK and low-molecular disperse systems comprising a low-molecular weight charge transporting material dispersed in a polymer. Organic electroluminescence devices generally has a vacuum deposited layer of a low-molecular weight charge transporting material. Of these materials, the low-molecular disperse systems are predominantly used especially in electrophotographic photoreceptors for their broad choice of material and high functions. While the recent advancement of performance of organic photoreceptors has made them applicable to high-speed copying machines and printers, the-state-of-art organic photoreceptors are not necessarily sufficient in terms of performance when applied to high-speed copying machines or printers. In particular, improvement in durability of organic photoreceptors has been demanded.

One of the factors decisive of the durability of organic photoreceptors is abrasion resistance of a charge transporting layer. Although low-molecular disperse system charge transporting layers, which are used predominantly, have exhibited satisfactory electrical characteristics, they inherently have poor resistance against mechanical abrasion because of the low molecular weight. Further, when applied to electroluminescence devices, the low-molecular charge transporting material tends to melt due to generated Joule's heat and to crystallize, which cause morphologic changes of the film.

On the other hand, charge transporting polymers have been studied with expectation of eliminating the above-mentioned disadvantages. Examples of charge transporting polymers proposed to date include polycarbonate prepared from a specific dihydroxyarylamine and a bischloroformate, disclosed in U.S. Pat. No. 4,806,443; polycarbonate prepared from a specific dihydroxyarylamine and phosgene, disclosed in U.S. Pat. No. 4,806,444; polycarbonate prepared from a bishydroxyalkylarylamine and a bischloroformate or phosgene, disclosed in U.S. Pat. No. 4,801,517; polycarbonate prepared from a specific dihydroxyarylamine or a bishydroxyalkylarylamine and a bischloroformate or polyester prepared from the former monomer and a bisacyl halide, disclosed in U.S. Pat. Nos. 4,937,165 and 4,959,288; polycarbonate or polyester of an arylamine having a specific fluorene skeleton, disclosed in U.S. Pat. No. 5,034,296; polyurethane, disclosed in U.S. Pat. No. 4,983,482; and polyester comprising a specific bisstyrylbisarylamine as a main chain, disclosed in JP-B-59-28903 (the term "JP-B" as used herein means an "examined published Japanese patent application"). Further, JP-A-61-20953, JP-A-1-134456, JP-A-1-134457, JP-A-1-134462, JP-A-4-133065, and JP-A-4-133066 (the term "JP-A" as used herein means an "unexamined published Japanese patent application) propose polymers having as a pendant group a charge transporting substituent, such as a hydrazone residue or a triarylamine residue, and photoreceptors containing the same. In particular, polymers having a tetraarylbenzidine skeleton exhibit high positive hole mobility and have high practical utility as reported in *The 6th International Congress on Advances in Non-impact Printing Technologies*, 306 (1990).

Although much study is being given to the charge transporting polymers in order to solve the problems associated with the low-molecular disperse systems, the charge transporting polymers now available are not deemed to be satisfactory in terms of mechanical strength, mobility, and stability against repeated use.

SUMMARY OF THE INVENTION

An object of the present invention is to provide a novel charge transporting polymer which is excellent in solubility, film-forming properties mechanical strength, positive hole mobility, and stability in repeated use.

Another object of the present invention is to provide an organic electronic device, such as an electrophotographic photoreceptor, containing the novel charge transporting polymer.

As a result of extensive investigations, the inventors of the present invention have found that a novel charge transporting polymer represented by formula (I) shown below, which comprises a repeating unit having an ether linkage structure, exhibits excellent charge transporting properties and mechanical strength and that an electrophotographic photoreceptor containing the same realizes high durability. The present invention has been completed based on this finding.

The present invention provides a charge transporting polymer represented by formula (I):

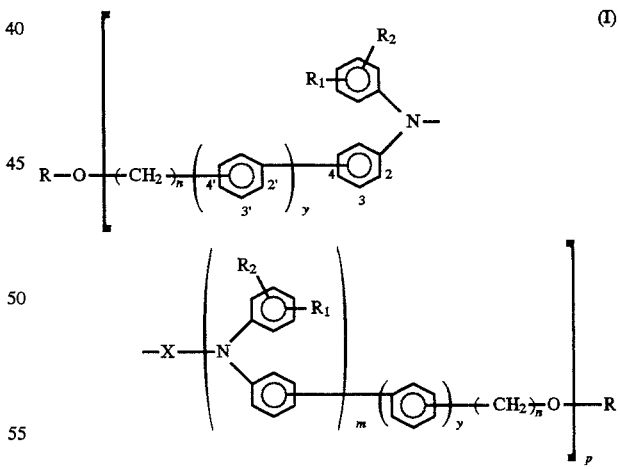

wherein R represents a hydrogen atom, an alkyl group, an acyl group or —CONH—R' wherein R' represents an alkyl group or a substituted or unsubstituted aryl group; $R_1$ and $R_2$, which may be the same or different, each represent a hydrogen atom, an alkyl group, an alkoxy group, a substituted amino group, a halogen atom, or a substituted or unsubstituted aryl group; X represents a substituted or unsubstituted divalent aromatic group; y represents 0 or 1; m represents 0 or 1; n represents an integer of 1 to 5; and p represents an integer of 5 to 5000.

Of the charge transporting polymers of formula (I), those represented by formula (I) wherein X is a substituted or unsubstituted biphenylene group, m is 1, and y is 0, i.e., tetraarylbenzidine polyethers represented by (I—1):

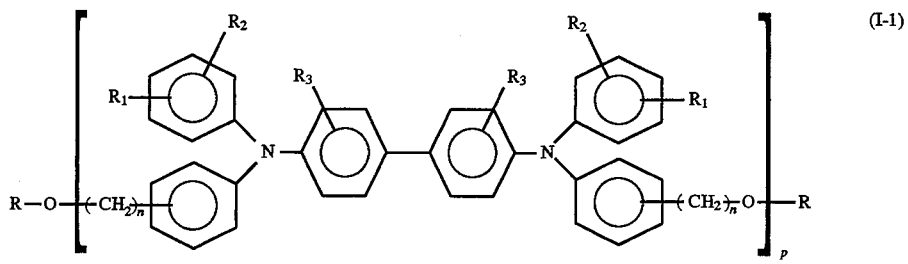

wherein R, $R_1$, $R_2$, n, and p are as defined above; and $R_3$ has the same meaning as $R_1$ and $R_2$, are preferred.

The present invention further provides a process for producing the charge transporting polymer represented by formula (I), which comprises intermolecular condensation of a charge transporting compound having a hydroxyl group, which is represented by formula (II):

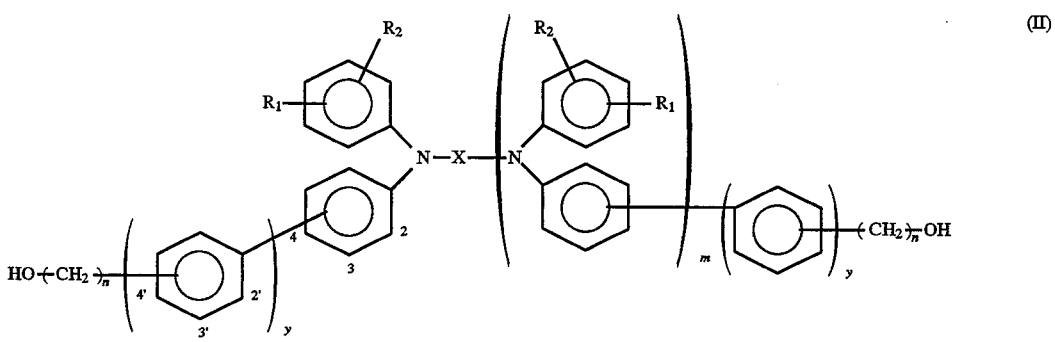

wherein $R_1$, $R_2$, X, y, m, and n are as defined above.

The present invention furthermore provides an organic electron device having a charge transporting layer containing the above-described charge transporting polymer.

DETAILED DESCRIPTION ON THE INVENTION

Figure 1:
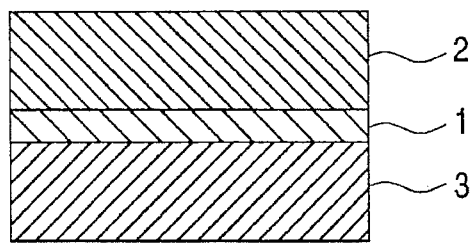
FIGS. 1-(a) through 1-(f) is each a schematic cross section of an electrophotographic photoreceptor according to the present invention.
Figure 1:
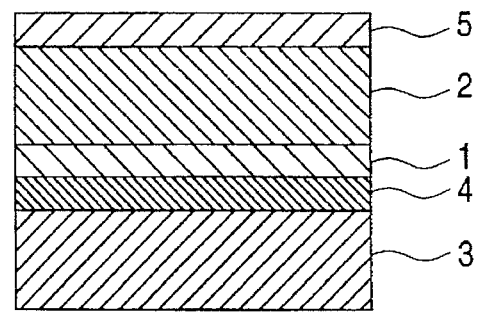
Figure 1:
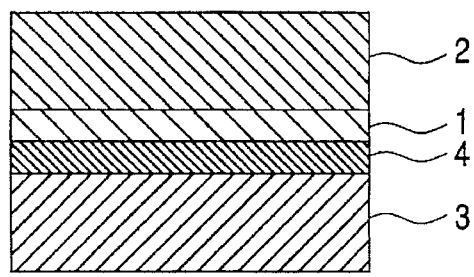
Figure 1:
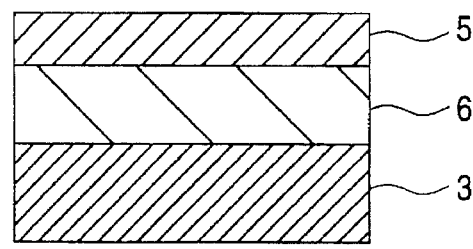
Figure 1:
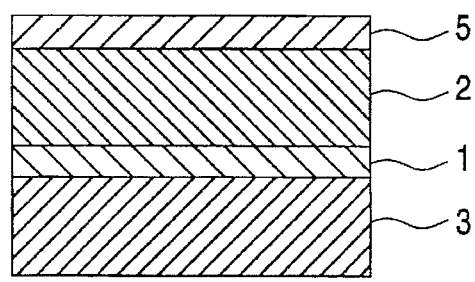
Figure 1:
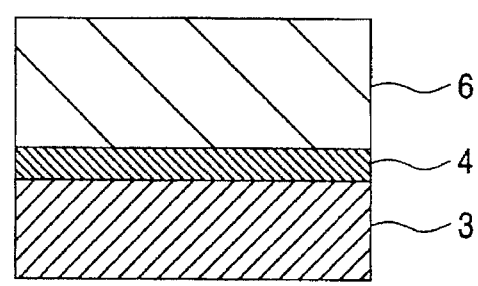

In formula (I), the alkyl group represented by $R_1$ and $R_2$ each preferably include an alkyl group having 1 to 4 carbon atoms, e.g., methyl group, ethyl group; the alkoxy group represented by $R_1$ and $R_2$ each preferably include an alkoxy group having 1 to 4 carbon atoms, e.g., methoxy group, ethoxy group; and the substituted an unsubstituted aryl group represented by $R_1$ and $R_2$ each preferably include that having 6 to 12 carbon atoms, e.g., phenyl group, naphthyl group.

The substituent of the substituted aryl group preferably includes an alkyl group having 1 to 4 carbon atoms such as methyl group, ethyl group; an alkoxy group having 1 to 4 carbon atoms such as methoxy group ethoxy group; biphenyl group; and naphthyl group.

The substituent of the substituted amino group preferably includes an alkyl group having 1 to 4 carbon atoms such as methyl group, ethyl group; and phenyl group.

More preferable group represented by $R_1$ and $R_2$ includes an alkyl group having 1 to 4 carbon atoms, an alkoxy group having 1 to 4 carbon atoms, a substituted amino group such as dimethylamino group, diphenylamino group, a halogen atom such as chlorine atom, bromine atom, an unsubstituted aryl group, and substituted aryl group which is substituted by biphenyl group or naphthyl group.

The alkyl group represented by R preferably includes an alkyl group having 1 to 4 carbon atoms, such as methyl group, ethyl group.

In formula (I), the substituted or unsubstituted divalent aromatic group as represented by X is not particularly limited. Specific examples of X are shown below.

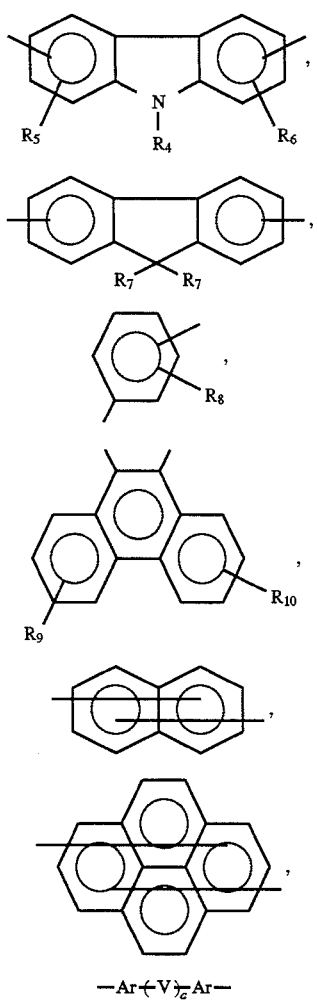

(1)

(2)

(3)

(4)

(5)

(6)

—Ar—(V)$_c$—Ar— (7)

wherein $R_4$ represents a hydrogen atom, an alkyl group having 1 to 4 carbon atoms, a substituted or unsubstituted phenyl group, a substituted or unsubstituted aralkyl group; $R_5$, $R_6$, $R_7$, $R_8$, $R_9$ and $R_{10}$ each represents a hydrogen atom, an alkyl group having 1 to 4 carbon atoms, an alkoxy group having 1 to 4 carbon atoms, a substituted or unsubstituted phenyl group, a substituted or unsubstituted aralkyl group, a halogen atom; Ar represents the following group (8); a represents 0 or 1;

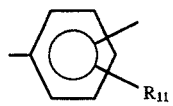 (8)

wherein $R_{11}$ represents a hydrogen atom, an alkyl group having 1 to 4 carbon atoms, an alkoxy group having 1 to 4 carbon atoms, a substituted or unsubstituted phenyl group, a substituted or unsubstituted aralkyl group, a halogen atom; V represents a group selected from the following groups (9) to (18), $-(CH_2)_b-$, (9)

$-C(CH_3)_2-$, (10)

$-O-$, (11)

$-S-$, (12)

 (13)

 (14)

$-C(CF_3)_2-$, (15)

$-Si(CH_3)_2-$, (16)

$-CH=CH-$, (17)

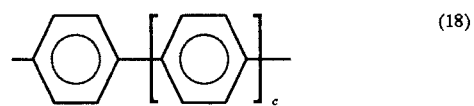 (18)

wherein b represents an integer of 1 to 10, and c represents an integer of 1 to 3.

Specific examples of the charge transporting polymers of formula (I) are tabulated below.

TABLE 1

| Compound No. | X | $R_1$ | $R_2$ | m | Bond Position | n | y | p |
|---|---|---|---|---|---|---|---|---|
| 1 | -⟨○⟩-⟨○⟩- | H | H | 1 | 4 | 1 | 0 | 195 |
| 2 | -⟨○⟩-⟨○⟩- | H | H | 1 | 4 | 2 | 0 | 205 |
| 3 | -⟨○⟩-⟨○⟩- | H | H | 1 | 3 | 2 | 0 | 210 |

TABLE 1-continued
| Compound No. | X | R₁ | R₂ | m | Bond Position | n | y | p |
|---|---|---|---|---|---|---|---|---|
| 4 | 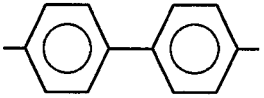 | H | H | 1 | 2 | 2 | 0 | 140 |
| 5 | 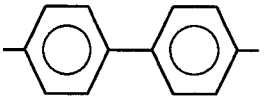 | H | H | 1 | 4, 4' | 1 | 1 | 155 |
| 6 | 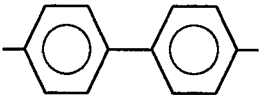 | H | H | 1 | 4, 4' | 2 | 1 | 150 |
| 7 | 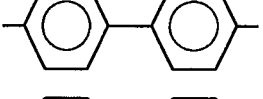 | H | 4-C₆H₅ | 1 | 4 | 1 | 0 | 60 |
| 8 |  | H | 4-C₆H₅ | 1 | 4 | 2 | 0 | 20 |
| 9 |  | H | 4-CH₃ | 1 | 4 | 1 | 0 | 155 |
| 10 |  | H | 4-CH₃ | 1 | 4 | 2 | 0 | 170 |
| 11 |  | H | 4-CH₃ | 1 | 4, 4' | 1 | 1 | 15 |
| 12 | 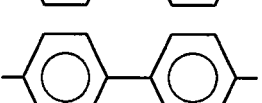 | 3-CH₃ | 4-CH₃ | 1 | 4 | 1 | 0 | 125 |
| 13 | 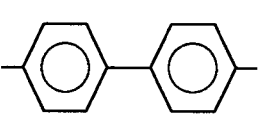 | 3-CH₃ | 4-CH₃ | 1 | 4 | 2 | 0 | 130 |
| 14 | 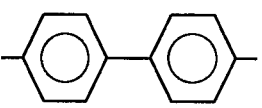 | 3-CH₃ | 4-CH₃ | 1 | 4, 4' | 2 | 1 | 35 |
| 15 | 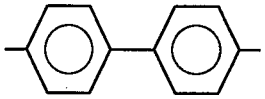 | H | 4-C₂H₅ | 1 | 4 | 1 | 0 | 80 |
| 16 | 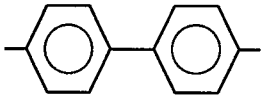 | H | 4-C₂H₅ | 1 | 4 | 2 | 0 | 20 |
| 17 |  | H | H | 1 | 4 | 4 | 0 | 165 |

TABLE 1-continued
| Compound No. | X | R₁ | R₂ | m | Bond Position | n | y | p |
|---|---|---|---|---|---|---|---|---|
| 18 | 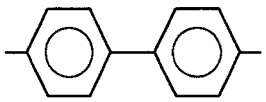 | H | H | 0 | 4 | 1 | 0 | 150 |
| 19 | 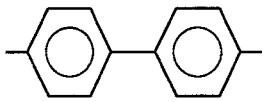 | H | H | 0 | 4 | 2 | 0 | 35 |
| 20 | 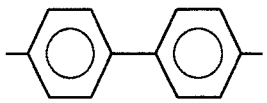 | H | H | 0 | 4, 4' | 2 | 1 | 30 |
| 21 | 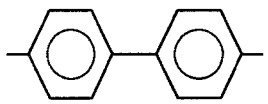 | 3-CH₃ | 4-CH₃ | 0 | 4, 4' | 2 | 1 | 30 |
| 22 | 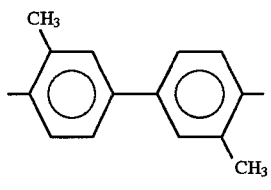 | H | H | 1 | 4 | 1 | 0 | 200 |
| 23 | 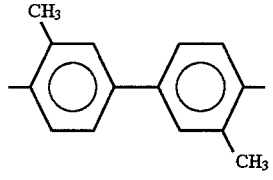 | H | H | 1 | 4 | 2 | 0 | 125 |
| 24 | 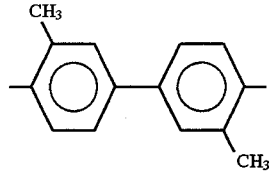 | H | H | 1 | 3 | 2 | 0 | 190 |
| 25 | 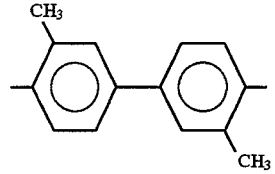 | H | H | 1 | 2 | 2 | 0 | 175 |
| 26 | 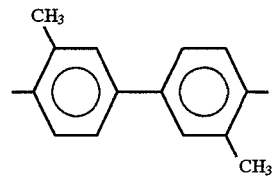 | H | H | 1 | 4, 4' | 2 | 1 | 90 |
| 27 | 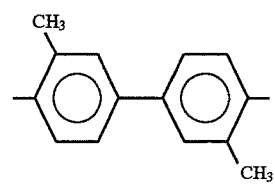 | 2-CH₃ | H | 1 | 4, 4' | 2 | 1 | 160 |

TABLE 1-continued

| Compound No. | X | R₁ | R₂ | m | Bond Position | n | y | p |
|---|---|---|---|---|---|---|---|---|
| 28 | [3-methyl-biphenyl with CH₃ groups] | 3-CH₃ | H | 1 | 4 | 1 | 0 | 175 |
| 29 | [3-methyl-biphenyl with CH₃ groups] | 4-CH₃ | H | 1 | 4 | 1 | 0 | 185 |
| 30 | [3-methyl-biphenyl with CH₃ groups] | 3-CH₃ | 4-CH₃ | 1 | 4 | 1 | 0 | 165 |
| 31 | [3-methyl-biphenyl with CH₃ groups] | 3-CH₃ | 4-CH₃ | 1 | 4 | 2 | 0 | 180 |
| 32 | [pyrene] | H | H | 1 | 4 | 1 | 0 | 105 |
| 33 | [pyrene] | H | H | 1 | 4 | 2 | 0 | 110 |
| 34 | [pyrene] | H | H | 1 | 3 | 1 | 0 | 155 |
| 35 | [pyrene] | H | H | 1 | 4, 4' | 2 | 1 | 95 |

TABLE 1-continued

| Compound No. | X | R₁ | R₂ | m | Bond Position | n | y | p |
|---|---|---|---|---|---|---|---|---|
| 36 | pyrene | 2-CH₃ | H | 1 | 4 | 2 | 0 | 20 |
| 37 | pyrene | 3-CH₃ | H | 1 | 4 | 1 | 0 | 150 |
| 38 | pyrene | 4-CH₃ | H | 1 | 4 | 1 | 0 | 135 |
| 39 | pyrene | 4-CH₃ | H | 1 | 4 | 2 | 0 | 75 |
| 40 | pyrene | 3-CH₃ | 4-CH₃ | 1 | 4 | 1 | 0 | 115 |
| 41 | pyrene | 3-CH₃ | 4-CH₃ | 1 | 4 | 2 | 0 | 125 |
| 42 | CH₃O-biphenyl-OCH₃ | H | H | 1 | 4 | 1 | 0 | 190 |
| 43 | CH₃O-biphenyl-OCH₃ | H | H | 1 | 4 | 2 | 0 | 130 |

TABLE 1-continued

| Compound No. | X | R₁ | R₂ | m | Bond Position | n | y | p |
|---|---|---|---|---|---|---|---|---|
| 44 | CH₃O—[biphenyl]—OCH₃ | H | H | 1 | 4, 4' | 1 | 1 | 160 |
| 45 | CH₃O—[biphenyl]—OCH₃ | H | H | 1 | 4, 4' | 2 | 1 | 155 |
| 46 | CH₃O—[biphenyl]—OCH₃ | H | 4-CH₃ | 1 | 4 | 1 | 0 | 55 |
| 47 | CH₃O—[biphenyl]—OCH₃ | 3-CH₃ | 4-CH₃ | 1 | 4 | 1 | 0 | 125 |
| 48 | CH₃O—[biphenyl]—OCH₃ | 3-CH₃ | 4-CH₃ | 1 | 4 | 2 | 0 | 110 |
| 49 | [fluorene with CH₃, CH₃] | H | H | 1 | 4 | 1 | 0 | 85 |
| 50 | [fluorene with CH₃, CH₃] | H | H | 1 | 4 | 2 | 0 | 35 |
| 51 | [fluorene with CH₃, CH₃] | H | H | 1 | 4 | 3 | 0 | 110 |
| 52 | [fluorene with CH₃, CH₃] | H | H | 1 | 3 | 1 | 0 | 90 |
| 53 | [fluorene with CH₃, CH₃] | H | H | 1 | 3 | 2 | 0 | 115 |

TABLE 1-continued

| Compound No. | X | R₁ | R₂ | m | Bond Position | n | y | p |
|---|---|---|---|---|---|---|---|---|
| 54 | 9,9-dimethylfluorene | 2-CH₃ | H | 1 | 4 | 1 | 0 | 110 |
| 55 | 9,9-dimethylfluorene | 3-CH₃ | H | 1 | 4 | 1 | 0 | 85 |
| 56 | 9,9-dimethylfluorene | 4-CH₃ | H | 1 | 4, 4' | 1 | 1 | 130 |
| 57 | 9,9-dimethylfluorene | 3-CH₃ | 4-CH₃ | 1 | 4 | 1 | 0 | 65 |
| 58 | 9,9-dimethylfluorene | 3-CH₃ | 4-CH₃ | 1 | 4 | 2 | 0 | 25 |
| 59 | 9,9-dimethylfluorene | 3-CH₃ | 4-CH₃ | 1 | 4, 4' | 1 | 1 | 30 |
| 60 | 9,9-dimethylfluorene | 3-CH₃ | 4-CH₃ | 1 | 4, 4' | 2 | 1 | 25 |
| 61 | phenylene | H | H | 0 | 4 | 1 | 0 | 175 |
| 62 | phenylene | H | H | 0 | 4 | 2 | 0 | 115 |
| 63 | phenylene | 3-CH₃ | H | 0 | 4 | 1 | 0 | 115 |
| 64 | phenylene | 4-CH₃ | H | 0 | 4 | 1 | 0 | 75 |
| 65 | phenylene | 3-CH₃ | 4-CH₃ | 0 | 4 | 1 | 0 | 90 |
| 66 | phenylene | 3-CH₃ | 4-CH₃ | 0 | 4 | 2 | 0 | 100 |

TABLE 1-continued

| Compound No. | X | R₁ | R₂ | m | Bond Position | n | y | p |
|---|---|---|---|---|---|---|---|---|
| 67 | -⌬- | 3-CH₃ | 4-CH₃ | 0 | 4 | 3 | 0 | 135 |
| 68 | -⌬- | H | H | 1 | 4 | 1 | 0 | 45 |
| 69 | -⌬- | H | H | 1 | 4 | 2 | 0 | 30 |
| 70 | -⌬- | H | H | 1 | 4, 4' | 1 | 1 | 60 |
| 71 | -⌬- | H | H | 0 | 3 | 1 | 0 | 105 |
| 72 | -⌬- | H | H | 0 | 3 | 2 | 0 | 95 |
| 73 | -⌬- | 4-CH₃ | H | 0 | 3 | 1 | 0 | 120 |
| 74 | -⌬- | 4-CH₃ | H | 0 | 3 | 2 | 0 | 55 |
| 75 | -⌬- | 3-CH₃ | 4-CH₃ | 0 | 3 | 1 | 0 | 160 |
| 76 | -⌬-⌬-⌬- | H | H | 1 | 4 | 1 | 0 | 60 |
| 77 | -⌬-⌬-⌬- | H | H | 1 | 4 | 2 | 0 | 35 |
| 78 | -⌬-⌬-⌬- | H | H | 1 | 3 | 1 | 0 | 50 |
| 79 | -⌬-⌬-⌬- | H | H | 1 | 3 | 2 | 0 | 90 |

TABLE 1-continued

| Compound No. | X | R₁ | R₂ | m | Bond Position | n | y | p |
|---|---|---|---|---|---|---|---|---|
| 80 | (triphenyl chain) | H | H | 1 | 4, 4' | 1 | 1 | 100 |
| 81 | (triphenyl chain) | H | H | 1 | 4, 4' | 2 | 1 | 25 |
| 82 | (triphenyl chain) | H | 4-Ph | 1 | 4 | 1 | 0 | 15 |
| 83 | (triphenyl chain) | H | 4-Ph | 1 | 4 | 2 | 0 | 40 |
| 84 | (triphenyl chain) | H | 4-Me | 1 | 4 | 1 | 0 | 130 |
| 85 | (triphenyl chain) | H | 4-Me | 1 | 4 | 2 | 0 | 110 |
| 86 | (triphenyl chain) | H | 4-Me | 1 | 4, 4' | 1 | 1 | 20 |
| 87 | (triphenyl chain) | 3-Me | 4-Me | 1 | 4 | 1 | 0 | 85 |
| 88 | (triphenyl chain) | 3-Me | 4-Me | 1 | 4 | 2 | 0 | 30 |
| 89 | (triphenyl chain) | 3-Me | 4-Me | 1 | 4, 4' | 1 | 1 | 75 |
| 90 | (triphenyl chain) | 3-Me | 4-Me | 1 | 4, 4' | 2 | 1 | 90 |

The charge transporting polymers of formula (I) can easily be prepared by intermolecular condensation of a hydroxyl-containing charge transporting material represented by formula (II).

It is known that the monomer, bishydroxyalkylarylamine of formula (II), is synthesized by reacting a diarylamine or a diarylbenzidine and 3-bromoiodobenzene, reacting bromine of the resulting compound with an alkyl lithium, and reacting the resulting compound with ethylene oxide as disclosed in JP-A-5-232727. However, since the bromine and iodine of 3-bromoiodobenzene are both reactive, the reaction product is obtained as a mixture, and the reaction yield is so reduced. Further, an alkyl lithium and ethylene oxide are dangerous and toxic and need care in handling. On the other hand, the bishydroxyalkylarylamine of formula (II) having a hydroxylkyl group at the p-position of the nitrogen atom can be prepared by first forming a triarylamine skeleton or a tetraarylbenzidine skeleton and introducing a formyl group, etc. thereto, which is then converted to a hydroxyalkyl group. However, this process cannot be applied to introduction of a hydroxyalkyl group to the ortho- or meta-position with respect to the nitrogen atom. The monomer having a hydroxyalkyl group at the o- or m-position can be obtained by reacting an arylamine or a diarylbenzidine, etc. with a halogenated carboalkoxyalkylbenzene to synthesize a compound having an alkylenecarbonic ester moiety and then reducing the ester group. This process is advantageous in that the position of the substituent can be altered to control the ionizing potential of the charge transporting polymer. Thus, the charge transporting monomer which can be used in the present invention may have various substituents at an arbitrary position thereof. Also, they are chemically stable and therefore easy to handle.

The charge transporting polymer of formula (I) is synthesized by polymerizing a charge transporting monomer of formula (II) according to the following embodiments.

(1) The bishydroxyalkyl-containing charge transporting monomer of formula (II) is subjected to dehydration condensation by heating. It is preferable to carry out the reaction in the absence of a solvent under reduced pressure so that the monomer may be heat melted to accelerate release of water. Where a solvent is used, solvents capable of forming an azeotropic mixture with water, such as trichloroethane, toluene, chlorobenzene, dichlorobenzene, nitrobenzene, and 1-chloronaphthalene, are effective for water removal. The solvent is used in an amount of 1 to 100 equivalents, preferably 2 to 50 equivalents, per equivalent of the charge transporting monomer. The reaction temperature is arbitrarily decided, but the reaction at the boiling point of the solvent used is recommended for release of water produced. In case where polymerization does not proceed, the solvent may be removed from the reaction system, and the viscous system may be stirred under heating.

(2) The dehydration condensation may be conducted in the presence of an acid catalyst, such as p-toluenesulfonic acid, protonic acids, e.g., hydrochloric acid, sulfuric acid, and trifluoroacetic acid, or a Lewis acid, e.g., zinc chloride. The acid catalyst is used in an amount of $1/10000$ to $1/10$ equivalent, preferably $1/1000$ to $1/50$ equivalent, per equivalent of the charge transporting monomer. In order to remove water produced, a solvent capable of forming an azeotropic mixture with water, such as toluene, chlorobenzene, dichlorobenzene, nitrobenzene, and 1-chloronaphthalene, is preferably used. The solvent is used in an amount of 1 to 100 equivalents, preferably 2 to 50 equivalents, per equivalent of the charge transporting monomer. The reaction temperature is arbitrarily decided, but the reaction at the boiling point of the solvent used is recommended for removal of water produced.

(3) The condensation reaction can also be carried out in the presence of a condensing agent. Useful condensing agents include alkyl isocyanides, such as cyclohexyl isocyanide; cyanic acid esters, such as p-tolyl cyanate and 2,2-bis(4-cyanatophenyl)propane; dichlorohexylcarbodiimide (DCC), and trichloroacetonitrile. The condensing agent is used in an amount of ½ to 10 equivalents, preferably 1 to 3 equivalents, per equivalent of the charge transporting monomer. Solvents which can be used effectively include toluene, chlorobenzene, dichlorobenzene, and 1-chloronaphalene. The solvent is used in an amount of 1 to 100 equivalents, preferably 2 to 50 equivalents, per equivalent of the charge transporting monomer. The reaction temperature is arbitrarily decided, but the reaction at a temperature of from the room temperature up to the boiling point of the solvent used is recommended for removal of water produced.

Of the above-mentioned embodiments (1) to (3), embodiments (1) and (3) are preferred because the reaction is hardly accompanied by isomerization or other side reactions. Embodiment (3) is especially preferred for its milder reaction conditions.

After completion of the reaction, where no solvent has been used, the reaction mixture is dissolved in an appropriate solvent, and the solution is added dropwise to a poor solvent in which the produced polymer is sparingly soluble, to precipitate the charge transporting polymer. Where a reaction solvent has been used, the reaction mixture is added as such. Poor solvents for the polymer include alcohols, e.g., methanol or ethanol, and acetone. The precipitated charge transporting polymer is collected, thoroughly washed with water or an organic solvent, and dried. If desired, the steps of dissolving in an appropriate organic solvent and dropping the solution in a poor solvent to reprecipitate the polymer may be repeated. During the reprecipitation step, it is desirable to stir the system efficiently by means of, e.g., a mechanical stirrer. The solvent for dissolving the polymer to be reprecipitated is used in an amount of 1 to 100 equivalents, preferably 2 to 50 equivalents, per equivalent of the polymer. The poor solvent is used in an amount of 1 to 1000 equivalents, preferably 10 to 500 equivalents, per equivalent of the polymer.

In the above-mentioned reaction, it is possible to use two or more, preferably 2 to 5, still preferably 2 or 3, kinds of bishydroxyalkyl-containing monomers to obtain a charge transporting copolymer. Combined use of different kinds of monomers is effective to control electrical characteristics, film-forming properties and solubility of the polymer.

The degree of polymerization of the charge transporting polymer, represented by p in formula (I), ranges from 5 to 5000, preferably from 10 to 3000, still preferably from 15 to 1000. If it is too low, the polymer has poor film-forming properties, failing to provide a strong film. If it is too high, the polymer has low solubility in solvents and thereby poor processability.

While the end group R of the polymer may be hydrogen originated in the starting monomer. Where the existence of the hydrogen atoms has influences on polymer physical properties such as solubility, film-forming properties and mobility, these properties can be controlled by modification of the end groups.

For example, the terminal hydroxyl group(s) may be etherified with an alkyl sulfate or an alkyl iodide. The etherifying reagent to be used is arbitrarily selected from dimethyl sulfate, diethyl sulfate, methyl iodide, and ethyl iodide and is used in an amount of 1 to 3 equivalents, preferably 1 to 2 equivalents, per equivalent of the terminal hydroxyl group(s). The etherification reaction can be carried out in the presence of a basic catalyst arbitrarily selected from sodium hydroxide, potassium hydroxide, sodium hydride, metallic sodium, and the like. The basic catalyst is used in an amount of 0.9 to 3 equivalents, preferably 1 to 2 equivalents, per equivalent of the terminal hydroxyl group (s). The reaction is carried out at a temperature of from 0° C. up to the boiling point of the solvent used. The solvent to be used is selected from inert solvents such as benzene, toluene, methylene chloride, tetrahydrofuran, N,N-dimethylformamide, dimethyl sulfoxide, N-methylpyrrolidone, 1,3-dimethyl-2-imidazolidinone, and mixtures of two or more thereof. Depending on the reaction, a quaternary ammonium salt, such as tetra-n-butylammonium iodide, may be used as a phase transfer catalyst.

The terminal hydroxyl group(s) may be acylated with an acid halide. While not limiting, suitable acid halides include acryloyl chloride, crotonoyl chloride, methacryoyl chloride, n-butyryl chloride, 2-furoyl chloride, benzoyl chloride, cyclohexanecarbonyl chloride, enanthyl chloride, phenylacetyl chloride, o-toluoyl chloride, m-toluoyl chloride, and p-toluoyl chloride. The acid halide is used in an amount of 1 to 3 equivalents, preferably 1 to 2 equivalents, per equivalent of the terminal hydroxyl group(s). Basic catalysts which can be used in the acylation include pyridine, dimethylaminopyridine, trimethylamine, and triethylamine. The basic catalyst is used in an amount of 1 to 3 equivalents, preferably 1 to 2 equivalents, per equivalent of the acid halide(chloride). Solvents to be used in the acylation include benzene, toluene, methylene chloride, tetrahydofuran, and methyl ethyl ketone. The reaction is carried out at a temperature of from 0° C. up to the boiling point of the solvent used, preferably from 0° C. to 30° C.

The acylation may also be effected by using an acid anhydride, such as acetic anhydride, with or without an inert solvent selected from benzene, toluene, chlorobenzene, etc. The reaction can be conducted at a temperature of from 0° C. to the boiling point of the solvent used, preferably from 50° C. to the boiling point of the solvent.

Further, an urethane residue may be introduced as the end group R by reacting with a monoisocyanate. Examples of suitable monoisocyanates are benzyl isocyanate, n-butyl isocyanate, t-butyl isocyanate, cyclohexyl isocyanate, 2,6-dimethyl isocyanate, ethyl isocyanate, isopropyl isocyanate, 2-methoxyphenyl isocyanate, 4-methoxyphenyl isocyanate, n-octadecyl isocyanate, phenyl isocyanate, m-tolyl isocyanate, p-tolyl isocyanate, and 1-naphthyl isocyanate. The isocyanate is used in an amount of 1 to 3 equivalents, preferably 1 to 2 equivalents, per equivalent of the terminal hydroxyl group(s). Solvents to be used include benzene, toluene, chlorobenzene, dichlorobenzene, methylene chloride, tetrahydrofuran, N,N-dimethylformamide, dimethyl sulfoxide, N-methylpyrrolidone, and 1,3-dimethyl-2-imidazolidinone. The reaction temperature is from 0° C. to the boiling point of the solvent used. If the reaction hardly proceeds, it may be accelerated by addition of a metallic compound, such as dibutyltin (II) dilaurate, stannic octylate or lead naphthenate, or a tertiary amine, such as triethylamine, trimethylamine, pyridine or dimethylaminopyridine, as a catalyst.

Of the monomers represented by formula (II), hydroxyalkyl-containing tetraarylbenzidine monomers represented by formula (II-1) shown below are preferred for ease of control of various physical properties, such as mobility and ionizing potential and ease of synthesis.

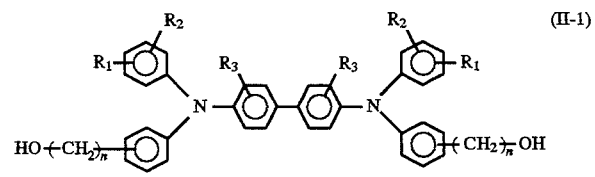

wherein $R_1$, $R_2$, $R_3$, and n are as defined above.

Accordingly, tetraarylbenzidine polyethers represented by formula (I-1) hereinabove described which are obtained from the tetraarylbenzidine monomers represented by formula (II-1) are preferable charge transporting polymers.

The charge transporting polymers according to the present invention can be used in combination with any known charge generating materials, such as bisazo pigments, trisazo pigments, phthalocyanine pigments, squarylium pigments, perylene pigments, and dibromoanthanthrone pigments, to provide electrophotographic photoreceptors. The charge transporting polymers of the invention provide excellent electrophotographic photoreceptors having high sensitivity and stability to repeated use particularly when combined with the charge generating materials previously proposed by the inventors of the present invention, for example, halogenogallium phthalocyanine crystals (JP-A-5-98181), halogenotin phthalocyanine crystals (JP-A-5-140472 and JP-A-5-140473), hydroxygallium phthalocyanine crystals (JP-A-5-263007 and JP-A-5-279591), and titanyl phthalocyanine hydrate crystals (JP-A-4-189873 and JP-A-5-43813).

Chlorogallium phthalocyanine crystals which can be used in the present invention can be prepared by the process disclosed in JP-A-5-98181, in which chlorogallium phthalocyanine crystals synthesized by a known process are dry ground mechanically in a automatic mortar, a planetary mill, a vibration mill, a CF mill, a roller mill, a sand mill, a kneader, etc., if desired followed by wet grinding using a solvent in a ball mill, a mortar, a sand mill, a kneader, etc. The solvent to be used in the wet grinding include aromatic hydrocarbons (e.g., toluene and chlorobenzene), amides (e.g., dimethylformamide and N-methylpyrrolidone), aliphatic alcohols (e.g., methanol, ethanol, and butanol), aliphatic polyhydric alcohols (e.g., methylene glycol, glycerin, and polyethylene glycol), aromatic alcohols (e.g., benzyl alcohol and phenethyl alcohol), esters (e.g., acetic esters, e.g., butyl acetate), ketones (e.g., acetone and methyl ethyl ketone), dimethyl sulfoxide, ethers (e.g., diethyl ether and tetrahydrofuran), mixtures of two or more of these organic solvents, and mixtures of these organic solvents and water. These solvents are used in an amount 1 to 200 times, preferably 10 to 100 times the weight of chlorogallium phthalocyanine. The solvent treatment is carried out at a temperature of 0° C. to the boiling point of the solvent, preferably 10° to 60° C. A grinding aid, such as sodium chloride or sodium sulfate, may be used in an amount 0.5 to 20 times, preferably 1 to 10 times, the weight of the pigment.

Dichlorotin phthalocyanine crystals which can be used in the present invention can be prepared by the process disclosed in JP-A-5-140472 and JP-A-5-140473, in which dichlorotin phthalocyanine crystals prepared by a known process are ground and treated with a solvent in the same manner as for the above-mentioned chlorogallium phthalocyanine.

Hydroxygallium phthalocyanine crystals which can be used in the present invention can be prepared by the process disclosed in JP-A-5-263007 and JP-A-5-279591, in which chlorogallium phthalocyanine crystals prepared by a known process are hydrolyzed in an aqueous acid or alkali solution or subjected to acid pasting to synthesize hydroxygallium phthalocyanine crystals, which are then subjected to (i) direct solvent treatment or (ii) wet grinding together with a solvent in a ball mill, a mortar, a sand mill, a kneader, etc., or (iii) dry grinding with no solvent, followed by solvent treatment. The solvent to be used in the solvent treatment or wet grinding includes aromatic hydrocarbons (e.g., toluene and chlorobenzene), amides (e.g., dimethylformamide and N-methylpyrrolidone), aliphatic alcohols (e.g., methanol, ethanol, and butanol), aliphatic polyhydric alcohols (e.g., ethylene glycol, glycerin, and polyethylene glycol), aromatic alcohols (e.g., benzyl alcohol and phenethyl alcohol), esters (e.g., acetic esters, e.g., butyl acetate), ketones (e.g., acetone and methyl ethyl ketone), dimethyl sulfoxide, ethers (e.g., diethyl ether and tetrahydrofuran), mixtures of two or more of these organic solvents, and mixtures of these organic solvents and water. These solvents are used in an amount 1 to 200 times, preferably 10 to 100 times, the weight of hydroxygallium phthalocyanine crystals. The treatment is carried out at a temperature of 0° C. to 150° C., preferably from room temperature to 100° C. A grinding aid, such as sodium chloride or sodium sulfate, may be used in an amount 0.5 to 20 times, preferably 1 to 10 times, the weight of the pigment.

Titanyl phthalocyanine crystals which can be used in the present invention are prepared by the process disclosed in JP-A-4-189873 and JP-A-5-43813, in which titanyl phthalocyanine crystals prepared by a known process are subjected to acid pasting, or salt milling with an inorganic salt by means of a ball mill, a mortar, a sand mill, a kneader, etc., to obtain titanyl phthalocyanine crystals showing a peak at 27.2° in the X-ray diffractometry and having relatively low crystalline properties, which are then subjected to solvent treatment or wet grinding together with a solvent in a ball mill, a mortar, a sand mill, a kneader, etc. The acid pasting is preferably carried out using sulfuric acid in a concentration of 70 to 100%, preferably 95 to 100%, at a dissolving temperature of −20° to 100° C., preferably 0° to 60° C. Concentrated sulfuric acid is usually used in an amount 1 to 100 times, preferably 3 to 50 times, the weight of the titanyl phthalocyanine crystals. Solvents to be used for precipitation include water and a mixture of water and an organic solvent at an arbitrary mixing ratio. Mixed solvents of water and an alcohol, e.g., methanol or ethanol, or mixed solvents of water and an aromatic solvent, e.g., benzene or toluene, are particularly preferred. The precipitating temperature is not particularly limited, but it is preferable to cool the system with ice, etc. to prevent heat generation. The ratio of titanyl phthalocyanine crystals to inorganic salt for salt milling ranges from 1/0.1 to 1/20, preferably from 1/0.5 to 1/5, by weight. The solvent which can be used in the subsequent solvent treatment or wet grinding includes aromatic hydrocarbons (e.g., toluene and chlorobenzene), aliphatic alcohols (e.g., methanol, ethanol, and butanol), halogenated hydrocarbons (e.g., dichloromethane, chloroform, and trichloroethane), mixtures of two or more of these organic solvents, and mixtures of these organic solvents and water. These solvents are used in an amount 1 to 100 times, preferably 5 to 50 times the weight of titanyl phthalocyanine crystals. The treatment is carried out at a temperature of from room temperature to 100° C., preferably from 50° to 100° C. A grinding aid may be used in the wet grinding in an amount 0.5 to 20 times, preferably 1 to 10 times, the weight of the pigment.

FIGS. 1-(a) through 1-(f) is each a schematic cross section of an electrophotographic photoreceptor according to the present invention. The photographic photoreceptor shown in FIG. 1-(a) comprises conductive support 3 having thereon charge generating layer 1 and charge transporting layer 2 in this order. The photoreceptor may further have subbing layer 4 on conductive support 3 as in FIG. 1-(b) or protective layer 5 on the surface thereof as in FIG. 1-(c), or both subbing layer 4 and protective layer 5 as in FIG. 1-(d). The photoreceptors shown in FIGS. 1-(e) and (f) have a single layer structure. The one shown in FIG. 1-(f) has subbing layer 4. The novel charge transporting polymer of the present invention can be applied to any of the layer structures, for example, to a photosensitive layer or a protective layer in a case of single structure layer, or to a charge transporting layer or a protective layer in a case of a superimposed structure as is shown in FIGS. 1-(a) through (f).

The conductive support which can be used in the present invention includes metals, such as aluminum, nickel, chromium, and stainless steel; plastic films having laminated thereon a thin film of aluminum, titanium, nickel, chromium, stainless steel, gold, vanadium, tin oxide, indium oxide, indium-tin oxide (ITO), etc.; and paper or plastic films coated or impregnated with a conductivity imparting agent. While not limiting, the conductive support is used in the form of a drum, a sheet, a plate, and the like. If desired, the conductive support may be subjected to various surface treatments, such as oxidation, chemical treatment, coloration, and sand graining, as far as the image quality is not impaired.

A subbing layer may be provided between a conductive support and a charge generating layer. A subbing layer not only blocks injection of unnecessary charges from the conductive support into the photosensitive layer at the time of charging of the photosensitive layer having a superimposed structure but serves as an adhesive layer for assuring adhesion between the photosensitive layer and the conductive support. In some cases, a subbing layer is also effective to prevent light reflection on a conductive support.

Materials which can be used as a subbing layer are conventional and include polyethylene resins, polypropylene resins, acrylic resins, methacrylic resins, polyamide resins, vinyl chloride resins, vinyl acetate resins, phenolic resins, polycarbonate resins, polyurethane resins, polyimide resins, vinylidene chloride resins, polyvinyl acetal resins, vinyl chloride-vinyl acetate copolymers, polyvinyl alcohol, water-soluble polyester resins, nitrocellulose, casein, gelatin, polyglutamic acid, starch, starch acetate, aminostarch, polyacrylic acid, polyacrylamide, zirconium chelate compounds, titanyl chelate compounds, titanium alkoxides, organotitanium compounds, and silane coupling agents.

The subbing layer usually has a thickness of from 0.01 to 10 μm, and preferably from 0.05 to 2 μm. The subbing layer can be formed by usual coating techniques, such as blade coating, wire bar coating, spray coating, dip coating, bead coating, air knife coating, and curtain coating.

If desired, an electron conducting layer may be provided between a subbing layer and a conductive support.

The charge transporting layer comprises the charge transporting polymer of the present invention either alone or in combination with known binder resins or other known charge transporting materials (e.g., hydrazone type, triarylamine type, and stilbene type charge transporting materials). Examples of binder resins with which the polymer of the present invention may be combined include polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazole, and polysilane. Of these binder resins, polycarbonate resins comprising a repeating unit represented by formulae (III) to (VIII) shown below or copolycarbonate resins thereof are particularly compatible with the charge transporting polymers of the present invention to provide a uniform film exhibiting satisfactory characteristics.

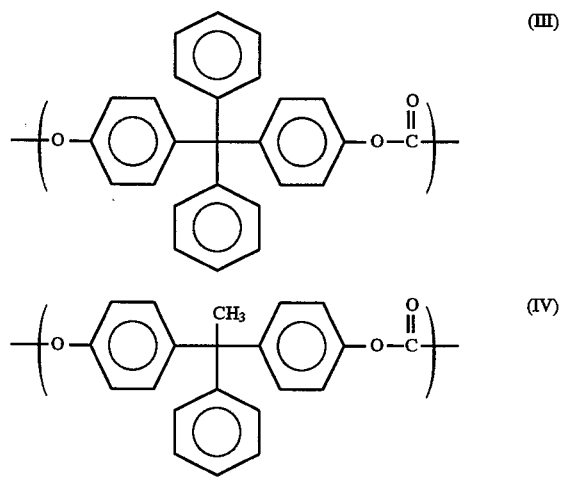

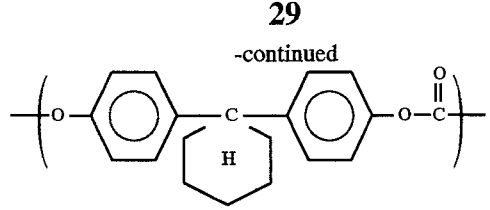
(V)

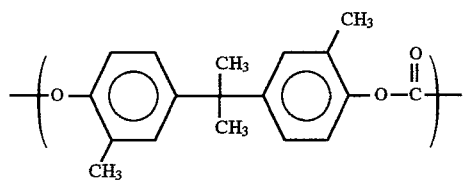
(VI)

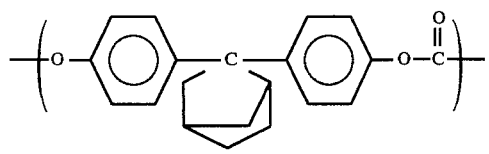
(VII)

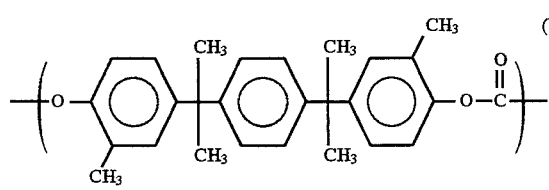
(VIII)

In the charge transporting layer of the superimposed layer structure, the charge transporting polymer is used preferably in an amount of 30 to 100% by weight, more preferably 40 to 100% by weight and most preferably 50 to 100% by weight to the binder resin.

In the single layer structure, the charge generating material is added in addition to the charge transporting polymer and the binder resin in an amount defined above, in an amount of preferably 0.5 to 100% by weight, more preferably 1 to 15% by weight and most preferably 2 to 10% by weight.

The charge generating layer is formed of a charge generating material and, if desired, a binder resin. Any known charge generating materials, such as bisazo pigments, trisazo pigments, phthalocyanine pigments, squarylium pigments, perylene pigments, and dibromoanthanthrone pigments, may be used. In particular, the aforementioned halogenogallium phthalocyanine crystals, halogenotin phthalocyanine crystals, hydroxygallium phthalocyanine crystals, and titanyl phthalocyanine hydrate crystals are preferred.

Binder resins which can be used in the charge generating layer can be chosen from a broad range of insulating resins, such as polyvinyl butyral resins, polyarylate resins (such as a polycondensate of bisphenol A and phthalic acid), polycarbonate resins, polyester resins, phenoxy resins, vinyl chloride-vinyl acetate copolymers, polyamide resins, acrylic resins, polyacrylamide resins, polyvinylpyridine resins, cellulose resins, urethane resins, epoxy resins, casein polyvinyl alcohol, and polyvinylpyrrolidone. Organic photoconductive polymers, such as poly-N-vinylcarbazole, polyvinylanthracene, polyvinylpyrene, and polysilane, can also be useful. These binder resins may be used either individually or in combination of two or more thereof.

A suitable weight ratio of the charge generating material to binder resin ranges from 10:1 to 1:10. Dispersing of the charge generating material in the resin solution can be carried out in a usual manner by means of a ball mill, an attritor, a sand mill, etc. It is effective to reduce the disperse particle size of the charge generating material to 0.5 μm or smaller, preferably not greater than 0.3 μm, still preferably not greater than 0.15 μm. Suitable solvents which can be used for dissolving the binder resin include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These organic solvents may be used either individually or as a mixture of two or more thereof.

The present invention will now be illustrated in greater detail with reference to Synthesis Examples and Examples, but it should be understood that the present invention is not deemed to be limited thereto. Unless otherwise indicated, all the parts and percents are by weight.

SYNTHESIS EXAMPLE 1

Synthesis of 3,3'-Dimethyl-N,N'-bis(3,4-dimethylphenyl)-N,N'-bis (4-hydroxymethylphenyl)-[1,1-biphenyl]-4,4'-diamine To a mixed solution consisting of 11.5 g of 3,3'-dimethyl-N,N'-bis (3,4-dimethylphenyl)-N,N'-diphenyl-[1,1'-biphenyl]-4,4'-diamine, 5 ml of N,N'-dimethylformamide, and 50 ml of methylene chloride was added dropwise 4.5 ml of phosphorus oxychloride over 30 minutes in a nitrogen atmosphere. After completion of the addition, the mixture was refluxed for 4 hours. After cooling to room temperature, 100 ml of methylene chloride and 300 ml of water were successively added to the reaction mixture, and the mixture was neutralized by slow addition of 20 g of potassium carbonate. The organic layer was washed with water, dried, and purified by silica gel column chromatography using a mixed solvent of ethyl acetate and n-hexane to give 8.8 g of a bisformyl compound as yellow powder.

Figure 2:
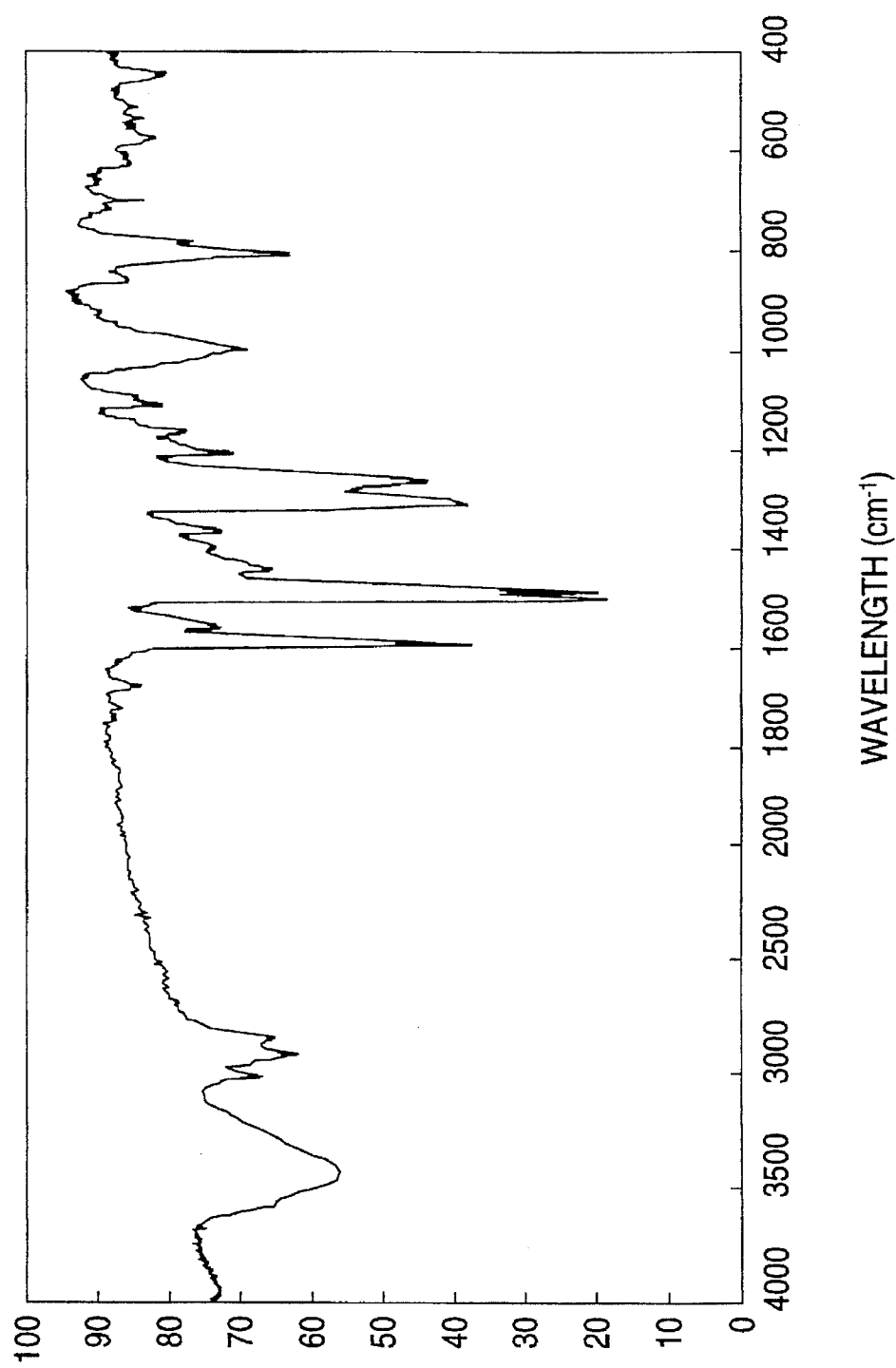
FIG. 2 is an infrared absorption spectrum of the bishydroxymethyl compound prepared in Synthesis Example 1.

A 5.0 g aliquot of the product was dissolved in 350 ml of ethanol, and 180 mg of sodium borohydride was added thereto, followed by refluxing for 2 hours. After cooling to room temperature, 30 ml of water was slowly added thereto. The precipitated crystals were collected by filtration and washed with methanol to give 4.4 g of a bishydroxymethyl compound. The IR spectrum of the product is shown in FIG. 2.

SYNTHESIS EXAMPLE 2

Synthesis of N,N'-Bis(4-ethylphenyl)-N,N'-bis(4-hydroxymethylphenyl) -[1,1'-biphenyl]-4,4'-diamine To a mixed solution consisting of 11 g of N,N'-bis(4-ethylphenyl) -N,N'-diphenyl-[1,1'-biphenyl]-4,4'-diamine, 5 ml of N,N'-dimethylformamide, and 50 ml of methylene chloride was added dropwise 4.5 ml of phosphorus oxychloride over 30 minutes in a nitrogen atmosphere. After completion of the addition, the mixture was refluxed for 4 hours. The reaction mixture was cooled to room temperature, 100 ml of methylene chloride and 300 ml of water were successively added thereto, and the mixture was neutralized by slow addition of 20 g of potassium carbonate. The organic layer was washed with water, dried, and purified by silica gel column chromatography using a mixed solvent of ethyl acetate and n-hexane to give 8.1 g of a bisformyl compound as yellow powder.

Figure 3:
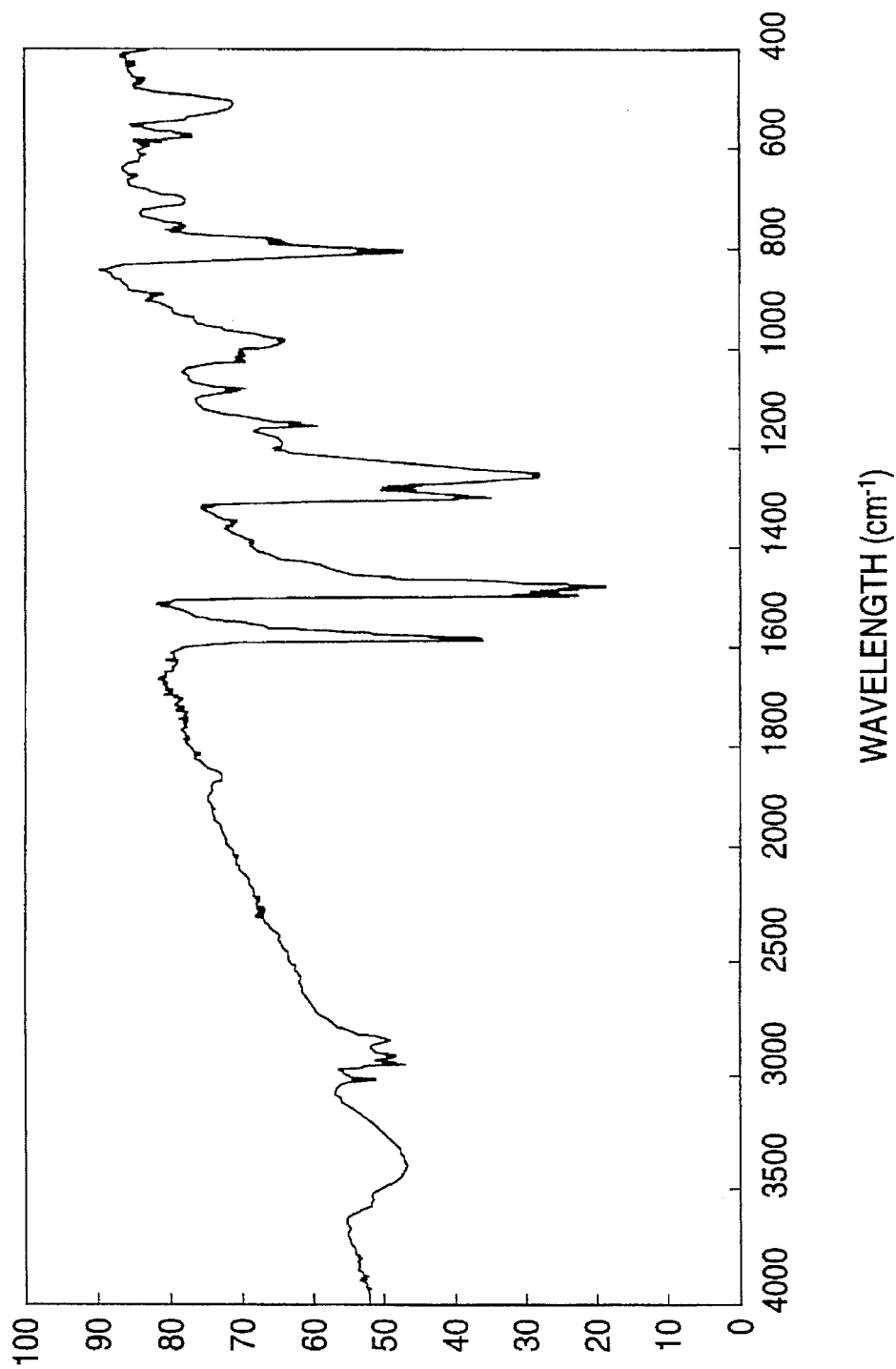
FIG. 3 is an infrared absorption spectrum of the bishydroxymethyl compound prepared in Synthesis Example 2.

A 5.0 g aliquot of the resulting bisformyl compound was dissolved in 350 ml of ethanol, and 180 mg of sodium borohydride was added thereto, followed by refluxing for 2 hours. After cooling to room temperature, 30 ml of water was slowly added thereto. The precipitated crystals were collected by filtration and washed with methanol to give 4.5 g of a bishydroxymethyl compound. The IR spectrum of the product is shown in FIG. 3.

SYNTHESIS EXAMPLE 3

Synthesis of N,N'-Bis(4-methylphenyl)-N,N'-bis(4-hydroxymethylphenyl) -[1,1'-biphenyl]-4,4'-diamine To 10 ml of N,N'-dimethylformamide was added 10 g of N,N'-bis(4-methylphenyl)-N,N'-diphenyl-[1,1'-biphenyl]-4, 4'-diamine, and 5.0 ml of phosphorus oxychloride was added thereto dropwise over 30 minutes in a nitrogen atmosphere. After completion of the addition, the mixture was refluxed for 4 hours, followed by cooling to room temperature. The reaction mixture was slowly added to 500 ml of a 10% aqueous sodium hydroxide solution, followed by stirring for 30 minutes at room temperature. The precipitated crystals were collected by filtration, dissolved in 250 ml of toluene, thoroughly washed with water in a separatory funnel, and dried. The organic layer was purified by chromatography on alumina to give 8.6 g of a bisformyl compound as yellow powder.

Figure 4:
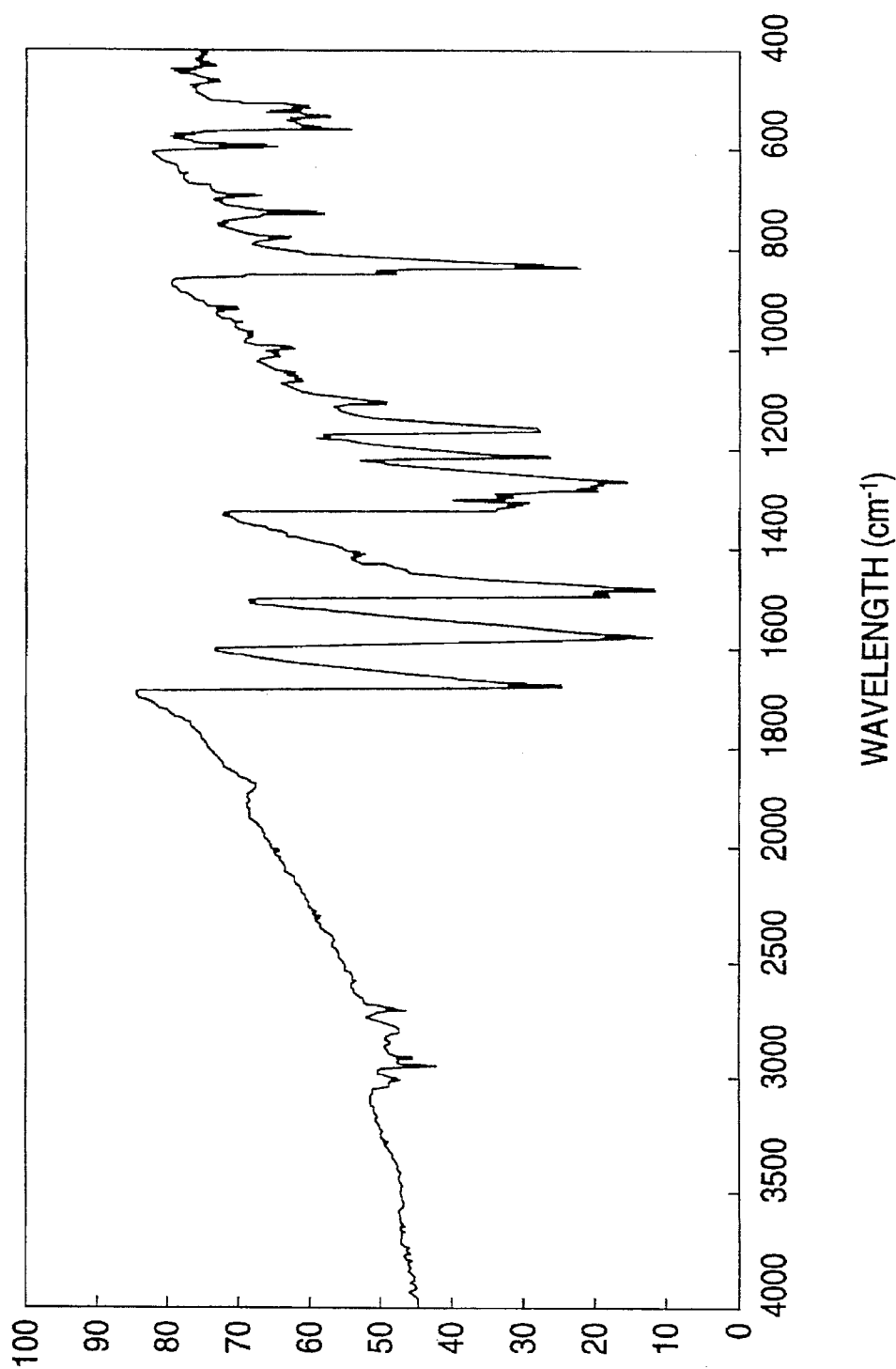
FIG. 4 is an infrared absorption spectrum of the bishydroxymethyl compound prepared in Synthesis Example 3.

A 5.0 g aliquot of the resulting bisformyl compound was dissolved in 350 ml of ethanol, and 180 mg of sodium borohydride was added thereto, followed by refluxing for 2 hours. After cooling to room temperature, 30 ml of water was slowly added thereto. The precipitated crystals were collected by filtration and washed with methanol to give 4.6 g of a bishydroxymethyl compound. The IR spectrum of the product is shown in FIG. 4.

SYNTHESIS EXAMPLE 4

Synthesis of N,N'-Diphenyl-N,N'-bis[4-(4-hydroxyethylphenyl)phenyl]-[1,1'-biphenyl]-4,4'-diamine In a 100 ml flask were charged 3.0 g of N,N'-diphenylbenzidine, 7.0 g of 4-ethoxycarbonylmethyl-4'-iodobiphenyl, 3.2 g of calcium carbonate, 0.5 g of copper sulfate pentahydrate, and 10 ml of n-tridecane. The mixture was allowed to react by heating at 230° C. for 1 hour in a nitrogen stream. After completion of the reaction, the reaction mixture was cooled to room temperature and dissolved in 20 ml of toluene. Any insoluble matter was removed by filtration, and the filtrate was purified by silica gel column chromatography using toluene to give 5.6 g of N,N'-diphenyl-N,N'-bis[4-(4-ethoxycarbonylmethylphenyl)-phenyl]-[1,1'-biphenyl]-4,4'-diamine as an oily substance.

Figure 5:
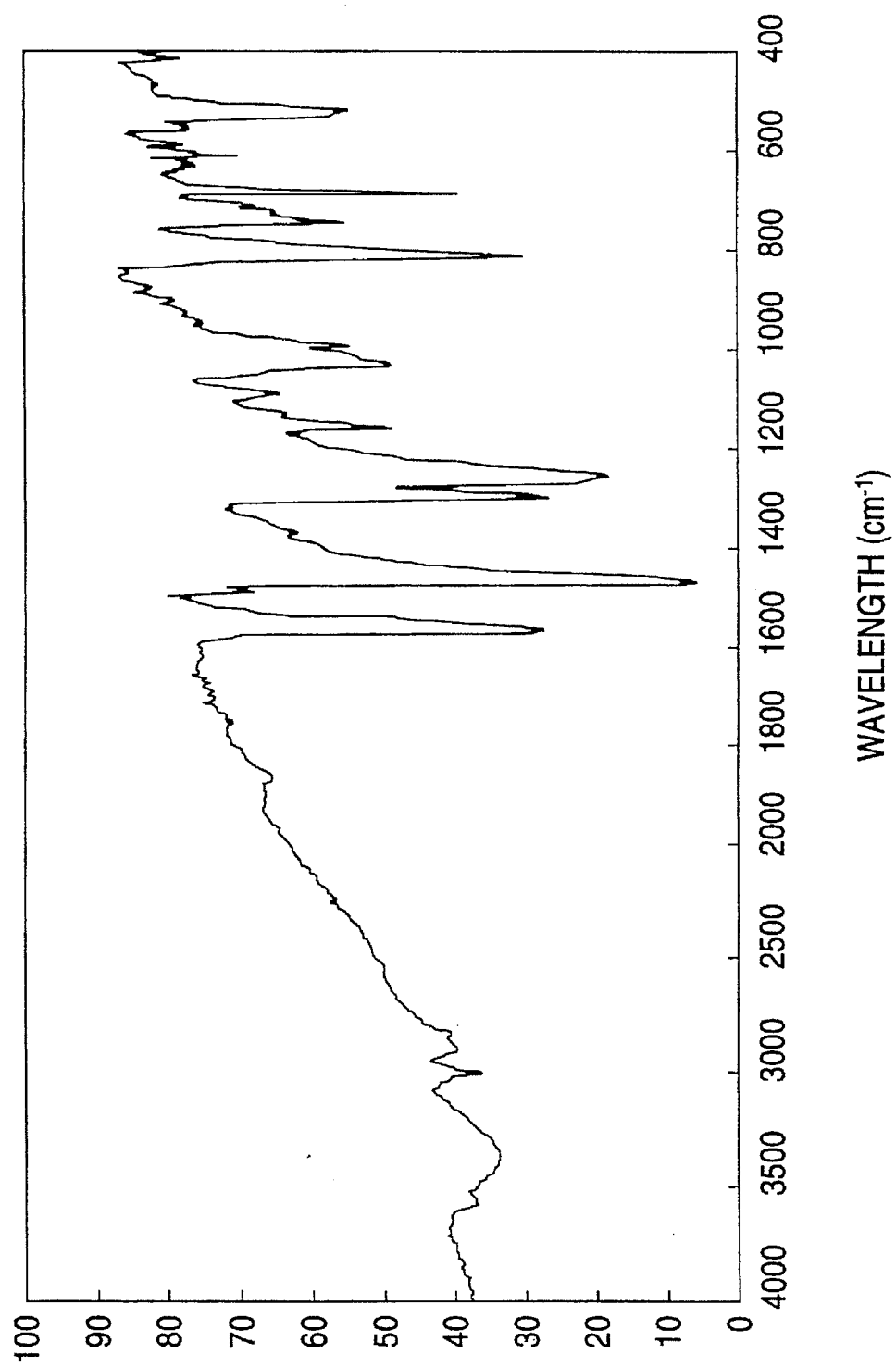
FIG. 5 is an infrared absorption spectrum of the bishydroxymethyl compound prepared in Synthesis Example 4.

A 5.0 g aliquot of the resulting product was dissolved in 50 ml of tetrahydrofuran, and 0.47 g of lithium aluminum hydride was added thereto, followed by stirring for 4 hours. Four milliliters of water were added to the reaction mixture to treat the unreacted lithium aluminum hydride. The solvent was displaced with 50 ml of methylene chloride, and the product was washed with water, dried, and purified by silica gel column chromatography using methylene chloride to give 4.1 g of pale yellow crude crystals. The crystals were dissolved in 100 ml of ethanol, decolored by treatment with activated carbon, and recrystallized from ethyl acetate/ethanol to obtain 3.6 g of the title compound. The IR spectrum of the product is shown in FIG. 5.

SYNTHESIS EXAMPLE 5

Figure 6:
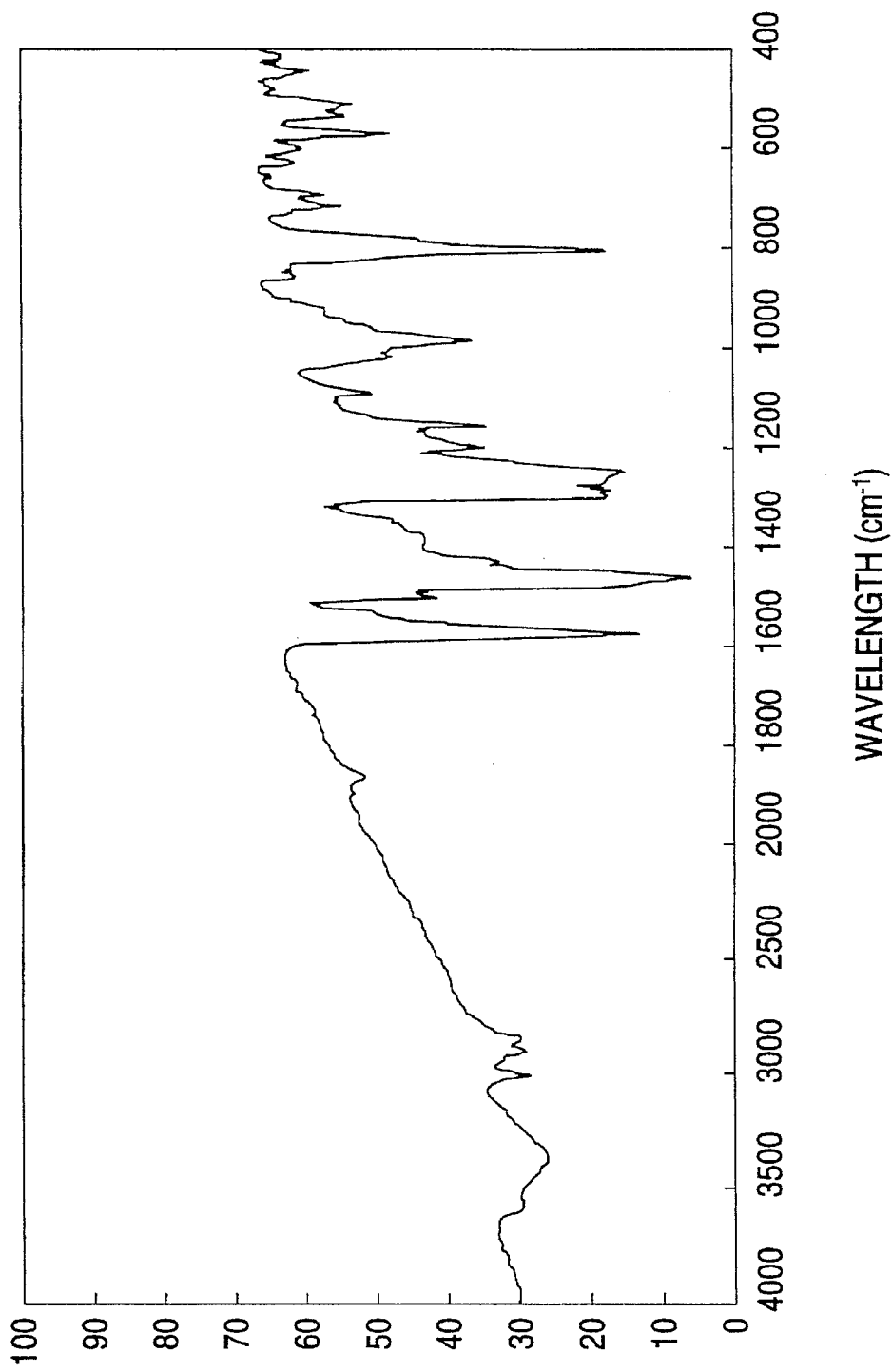
FIG. 6 is an infrared absorption spectrum of the bishydroxymethyl compound prepared in Synthesis Example 5.

Synthesis of N,N'-bis(3,4-dimethylphenyl)-N,N'-bis (4-hydroxymethylphenyl) -[1,1':4',1"-terphenyl]-4,4"-diamine In 150 ml of tetrahydrofuran was dissolved 5.0 g of N,N'-bis(3,4-dimethylphenyl)-N,N'-bis[4-(2-methoxycarbonyl)phenyl]-[1,1':4',1"-terphenyl]-4,4"-diamine, and 1.0 g of lithium aluminum hydride was added thereto and the mixture thus obtained was refluxed for 4 hours, followed by cooling to room temperature. To the reaction mixture was slowly added 15 ml of methanol to treat unreacted lithium aluminum hydride. After 100 ml of water and 200 ml of methylene chloride were added thereto, the mixture thus obtained was subjected to filtration using 20 g of Sellaite. The methylene chloride phase was fully washed with water and then sodium sulfate was added, followed by drying. After methylene chloride was distilled off, the residue was recrystallized from ethanol to obtain 3.8 g of the titled compound as colorless powder. The IR spectrum of the product is shown in FIG. 6.

SYNTHESIS EXAMPLE 6

To 230 parts of quinoline were added 30 parts of 1,3-diiminoisoindoline and 9.1 parts of gallium trichloride, and the mixture was allowed to react at 200° C. for 3 hours. The reaction product was collected by filtration, washed successively with acetone and methanol, and dried to obtain 28 parts of chlorogallium phthalocyanine crystals. Three parts of the resulting crystals were dry ground for 3 hours in a automatic mortar Labo-Mill UT-21, manufactured by Yamato Kagaku K.K. A 0.5 part aliquot of the grinds was milled in 20 parts of benzyl alcohol together with 60 parts of glass beads (diameter: 1 mm) at room temperature for 24 hours. The glass beads were separated by filtration, and the filtrate was washed with 10 parts of methanol and dried to obtain chlorogallium phthalocyanine crystals having intense diffraction peaks at 7.4°, 16.6°, 25.5°, and 28.3°. The resulting chlorogallium phthalocyanine crystals are designated as CG-1.

SYNTHESIS EXAMPLE 7

To 350 ml of 1-chloronaphthalene were added 50 g of phthalonitrile and 27 g of anhydrous stannic chloride, and the mixture was allowed to react at 195° C. for 5 hours. The reaction product was collected by filtration, washed successively with 1-chloronaphthalene, acetone, methanol, and water, and dried under reduced pressure to give 18.3 g of dichlorotin phthalocyanine crystals. A 5 g portion of the resulting crystals was put in an agate-made pot together with 10 g of sodium chloride and 500 g of agate balls (diameter: 20 mm) and ground by means of a planetary ball mill Model P-5 manufactured by Fritch Co., Ltd. at 400 rpm for 10 hours, thoroughly washed with water, and dried. A 0.5 g aliquot of the grinds was subjected to milling together with 15 g of tetrahydrofuran and 30 g of glass beads (diameter: 1 mm) at room temperature for 24 hours. The glass beads were separated by filtration, and the filtrate was washed with methanol and dried to obtain dichlorotin phthalocyanine crystals having intense diffraction peaks at 8.5°, 11.2°, 14.5°, and 27.2°. The resulting crystals are designated CG-2.

SYNTHESIS EXAMPLE 8

Three parts of the chlorogallium phthalocyanine crystals (CG-1) obtained in Synthesis Example 5 were dissolved in 60 parts of concentrated sulfuric acid at 0° C., and the acidic solution was dropped into 450 parts of distilled water kept at 5° C. to reprecipitate. The reprecipitated crystals were washed with distilled water, diluted aqueous ammonia, etc. and dried to recover 2.5 parts of hydroxygallium phthalocyanine crystals. The crystals were ground in an automatic mortar for 5.5 hours, and a 0.5 part aliquot of the grinds was subjected to milling together with 15 parts of dimethylformamide and 30 parts of glass beads (diameter: 1 mm) for 24 hours. The crystals were separated, washed with methanol, and dried to give hydroxygallium phthalocyanine crystals having intense diffraction peaks at 7.5°, 9.9°, 12.5°, 16.3°, 18.6°, 25.1°, and 28.3°. The resulting crystals are designated as CG-3.

SYNTHESIS EXAMPLE 9

To 200 parts of 1-chloronaphthalene were added 30 parts of 1,3-diiminoisoindoline and 17 parts of titanium tetrabutoxide, and the mixture was allowed to react at 190° C. for 5 hours in a nitrogen stream. The reaction product was collected by filtration, washed successively with aqueous ammonia, water, and acetone to obtain 40 parts of titanyl phthalocyanine. Five parts of the resulting crystals were ground for 3 hours in a automatic mortar Labo-Mill UT-21, manufactured by Yamato Kagaku K.K., together with 10 parts of sodium chloride and then thoroughly washed with distilled water and dried to give 4.8 parts of titanyl phthalocyanine crystals, which exhibited a distinct diffraction peak at 27.3°. Two parts of the crystals was stirred in a mixed solvent of 20 parts of distilled water and 2 parts of monochlorobenzene at 50° C. for 1 hour, filtered, thoroughly washed with methanol, and dried to obtain titanyl phthalocyanine hydrate crystals having an intense diffraction peak at 27.33°. The resulting chlorogallium phthalocyanine crystals are designated as CG-4.

EXAMPLE 1

Synthesis of Charge Transporting Polymer (30)

Figure 7:
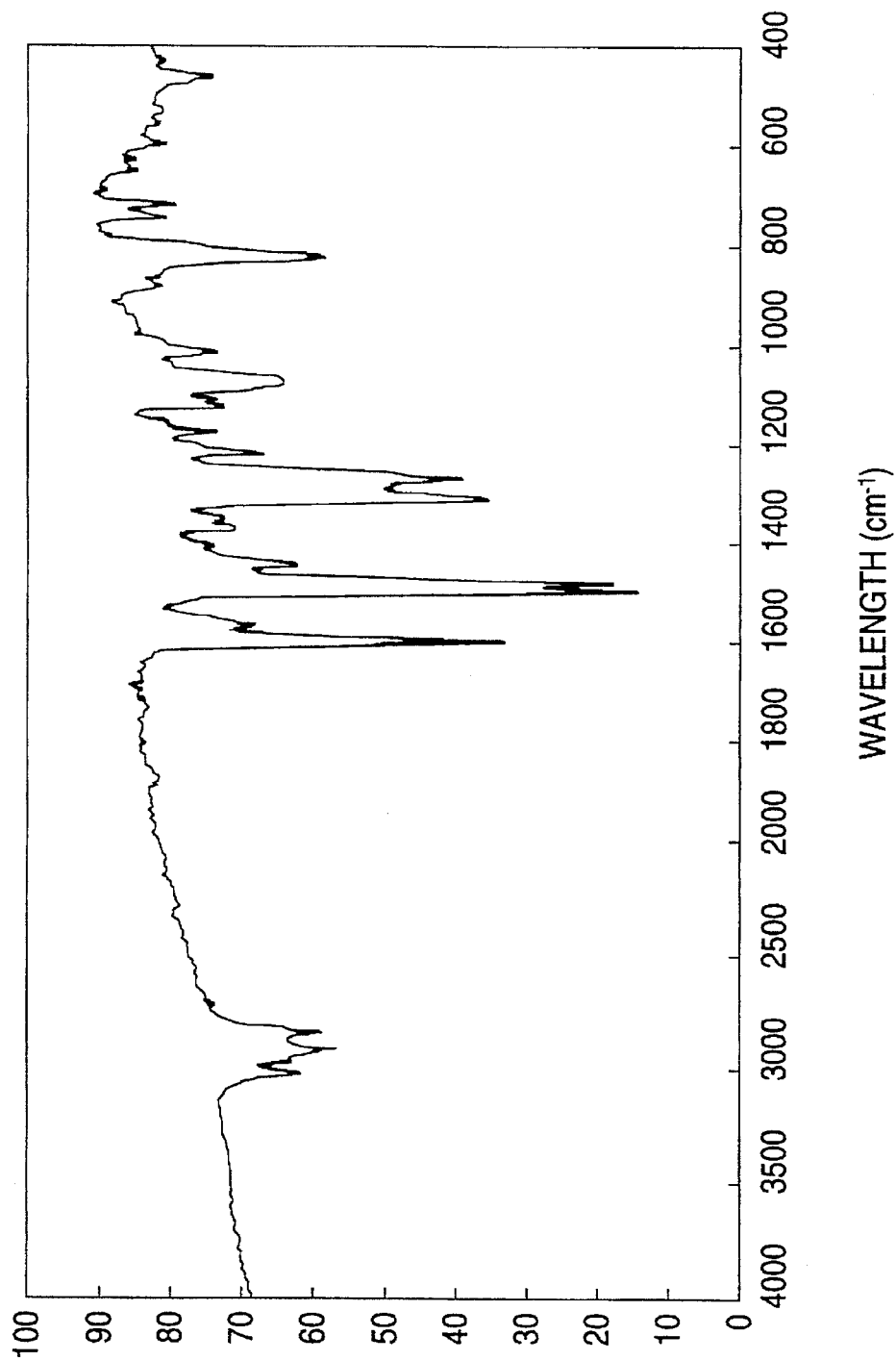
FIG. 7 is an infrared absorption spectrum of the charge transporting polymer prepared in Example 1.

In 15 ml of chlorobenzene was dissolved 3.0 g of 3,3'-dimethyl-N,N'-bis(3,4-dimethylphenyl)-N,N'-bis(4-hydroxymethylphenyl)-[1,1'-biphenyl]-4,4'-diamine, and 1.0 g of 2,2-bis(4-cyanatophenyl)propane was added thereto, followed by refluxing for 6 hours in a nitrogen atmosphere. The reaction mixture was cooled to room temperature and poured into 500 ml of methanol under stirring. The thus precipitated polymer was collected by filtration and thoroughly washed with methanol. The polymer was further heat-refluxed in 300 ml of acetone, and the insoluble polymer was recovered by filtration and dried to give 2.4 g of the title polymer. The weight average molecular weight (Mw) of the resulting polymer was $1.0 \times 10^5$ as measured by gel-permeation chromatography (GPC) (styrene conversion; p=ca. 165). The IR spectrum of the polymer is shown in FIG. 7.

EXAMPLE 2

Synthesis of Charge Transporting Polymer (15)

Figure 8:
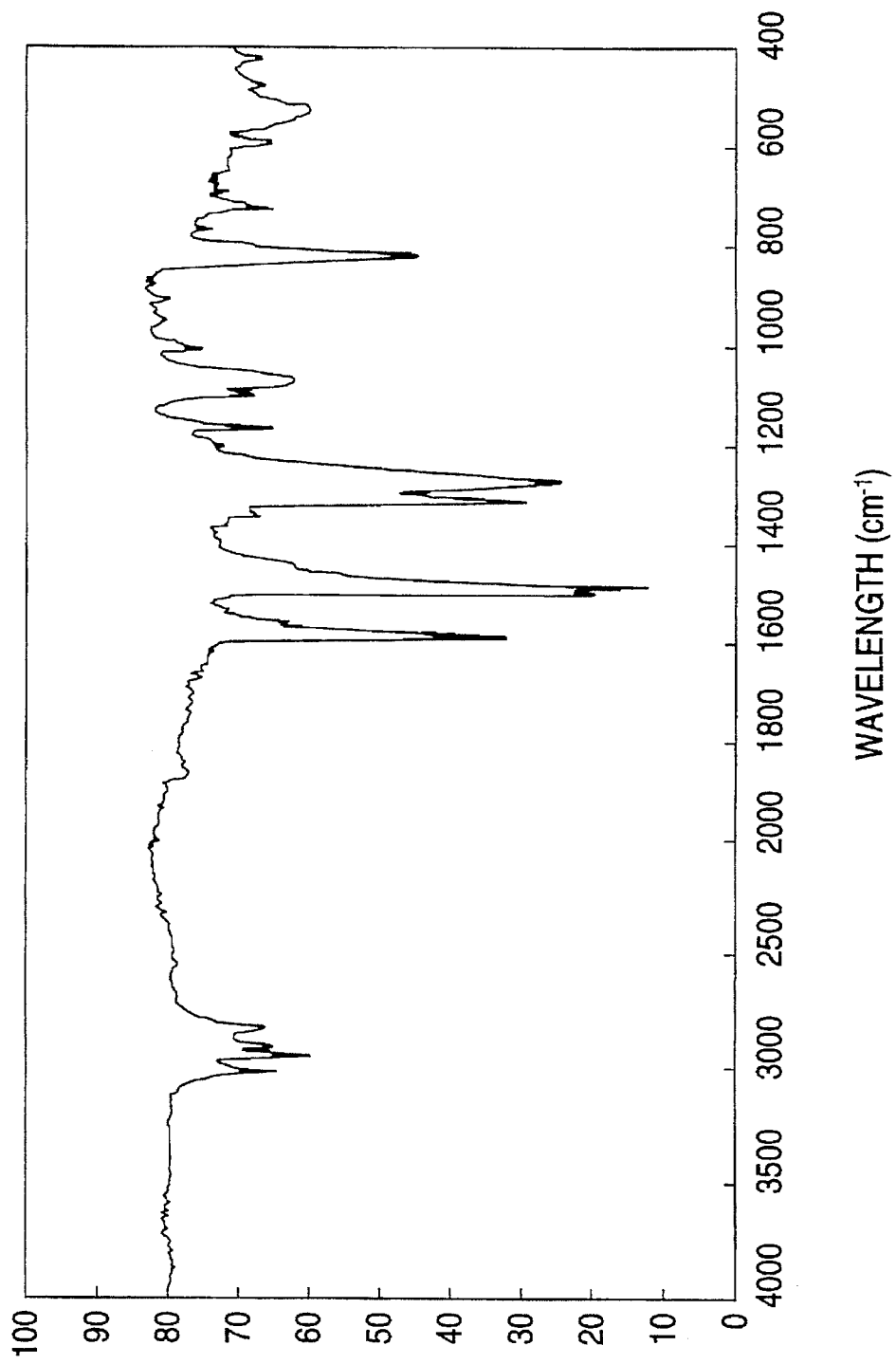
FIG. 8 is an infrared absorption spectrum of the charge transporting polymer prepared in Example 2.

In 15 ml of o-dichlorobenzene was dissolved 3.0 g of N,N'-bis(4-ethylphenyl)-N,N'-bis(4-hyhdroxymethylphenyl)[-1,1'-biphenyl]-4,4'-diamine, and the solution was refluxed for 2 hours in a nitrogen atmosphere. The temperature of the oil bath was raised up to 200° C. to gradually distill off the solvent, and the viscous reaction mixture was further heated for 2 hours while stirring. After cooling to room temperature, 50 ml of methylene chloride was added thereto, and the resulting solution was poured into 300 ml of acetone under stirring. The precipitated polymer was recovered by filtration, washed successively with ethanol and acetone, and dried to obtain 2.2 g of the title polymer. The resulting polymer had an Mw of $5.1 \times 10^4$ as measured by GPC (styrene conversion; p=ca. 80). The IR spectrum of the polymer is shown in FIG. 8.

EXAMPLE 3

Synthesis of Charge Transporting Polymer (9)

Figure 9:
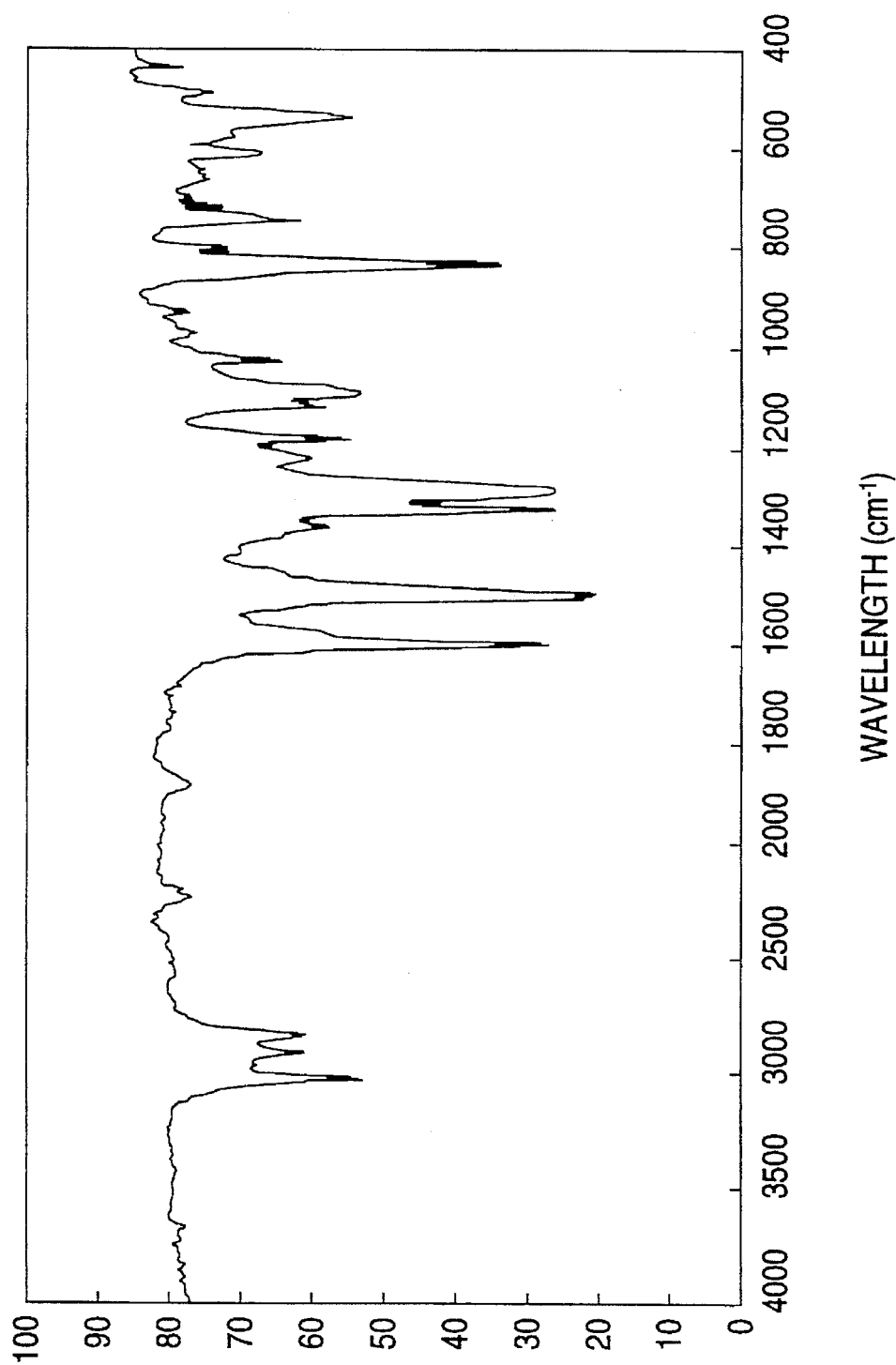
FIG. 9 is an infrared absorption spectrum of the charge transporting polymer prepared in Example 3.

In 10 ml of o-dichlorobenzene was dissolved 2.5 g of N,N'-bis(4-methylphenyl)-N,N'-bis(4-hyhdroxymethylphenyl)[1,1'-biphenyl]-4,4'-diamine, and 2.0 g of 2,2-bis(4-cyanatophenyl)propane was added thereto. The reaction mixture was refluxed for 6 hours in a nitrogen atmosphere. After cooling to room temperature, the reaction mixture was poured into 500 ml of methanol under stirring. The precipitated polymer was recovered by filtration, and washed thoroughly with methanol. The polymer was dissolved in 20 ml of methylene chloride and reprecipitated in 500 ml of methanol while stirring, and the precipitated polymer was filtered and washed thoroughly with methanol. The polymer was added to 300 ml of acetone, followed by heat-refluxing. The insoluble polymer was collected by filtration and dried to give 1.9 g of the title polymer. The resulting polymer had an Mw of $8.9 \times 10^4$ as measured by GPC (styrene conversion; p=ca. 155). The IR spectrum of the polymer is shown in FIG. 9.

EXAMPLE 4

Synthesis of Charge Transporting Polymer (6)

Figure 10:
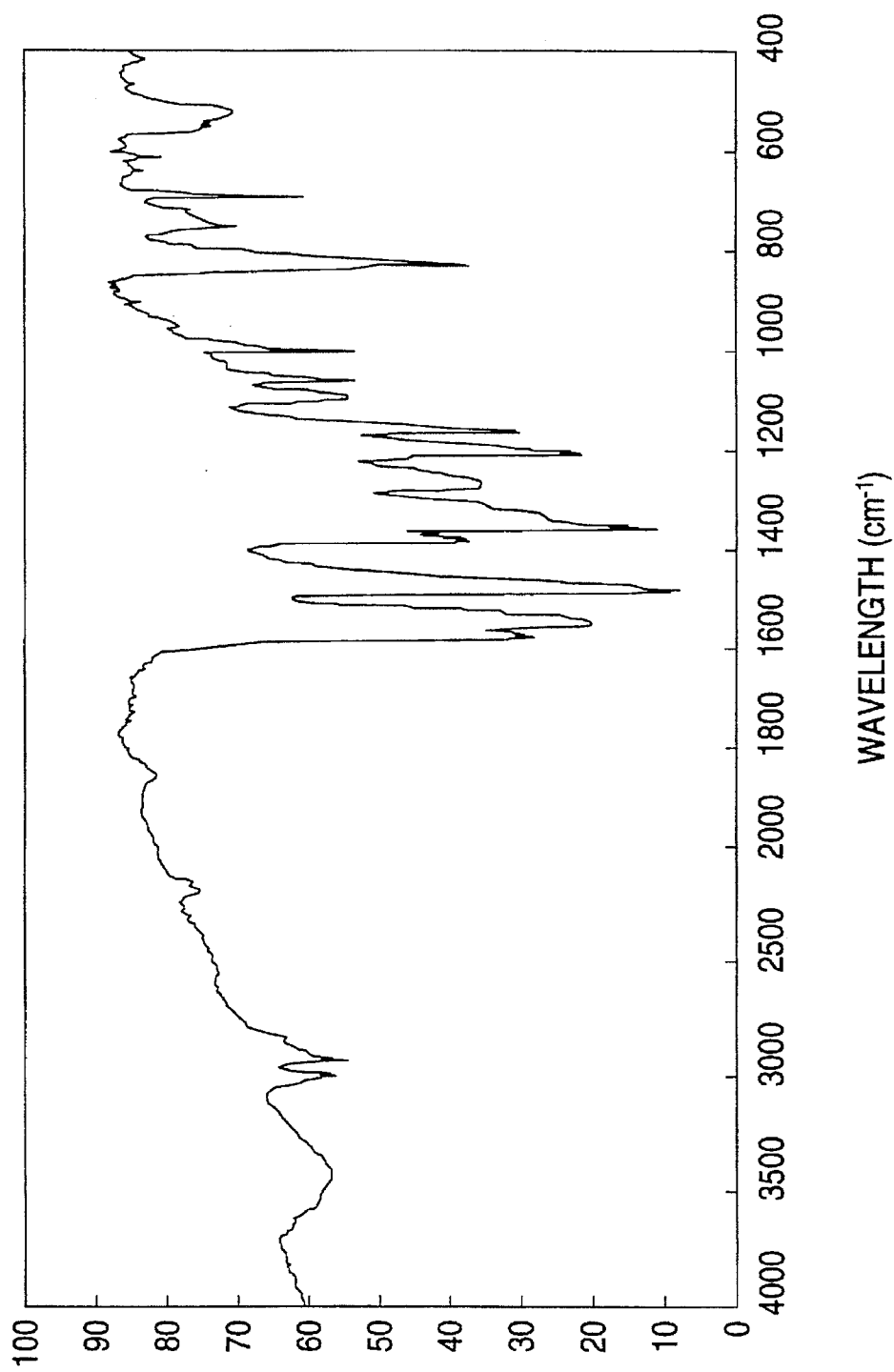
FIG. 10 is an infrared absorption spectrum of the charge transporting polymer prepared in Example 4.

In 5 ml of chlorobenzene was dissolved 2.4 g of N,N'-diphenyl -N,N'-bis[4-(4-hydroxyethylphenyl)-phenyl]-[1,1'-biphenyl]-4,4'-diamine, and 1.8 g of 2,2-bis(4-cyanatophenyl)propane was added thereto, followed by refluxing for 6 hours in a nitrogen atmosphere. The reaction mixture was cooled to room temperature, and 20 ml of methylene chloride was added thereto. Any insoluble matter was removed by filtration, and the filtrate was poured into 300 ml of methanol under stirring. The precipitated polymer was collected by filtration and thoroughly washed with methanol. The polymer was dissolved in 20 ml of methylene chloride and reprecipitated in 300 ml of methanol under stirring. The precipitated polymer was collected by filtration and thoroughly washed with methanol. The polymer was added to 100 ml of acetone, and the mixture was heat refluxed. The insoluble polymer was filtered and dried to give 1.8 g of the title polymer. The resulting polymer had an Mw of $1.0 \times 10^5$ as measured by GPC (styrene conversion; p =ca. 150). The IR spectrum of the polymer is shown in FIG. 10.

EXAMPLE 5

Synthesis of charge transporting polymer (87)

Figure 11:
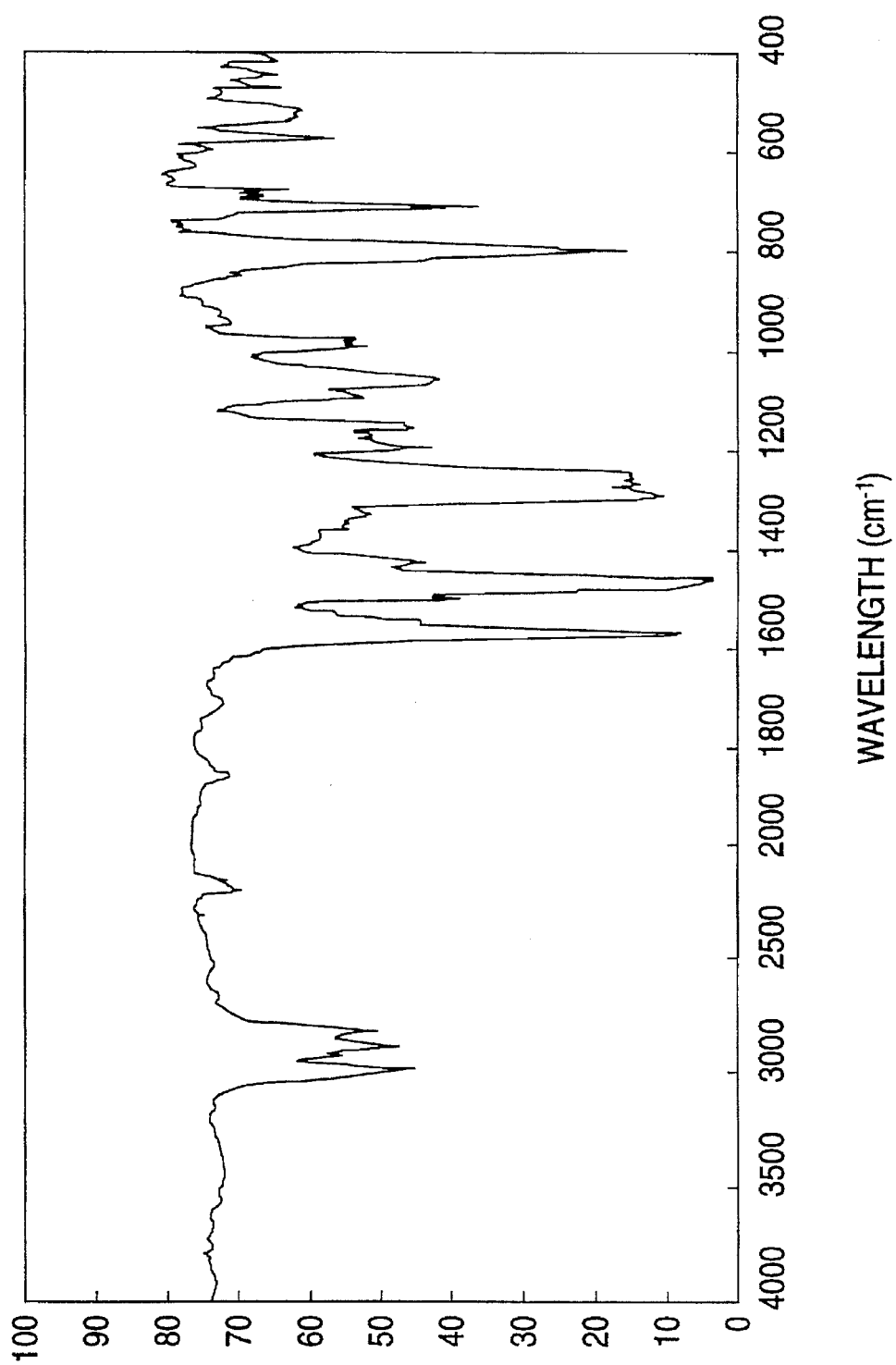
FIG. 11 is an infrared absorption spectrum of the charge transporting polymer prepared in Example 5.

To 10 ml of chlorobenzene was dissolved 3.0 g of N,N'-bis (3,4-dimethylphenyl)-N,N'-bis(4-hydroxymethylphenyl)-[1,1':4',1"-terphenyl]-4,4'-diamine, and then 1.1 g of p-tolyl cyanate was added, followed by refluxing for 4 hours under a nitrogen gas atmosphere. After cooling to room temperature, the reaction solution was recrystallized in 500 ml of methanol with stirring. The precipitated polymer thus obtained was filtrated and washed fully with methanol. The polymer thus obtained was added to 500 ml of acetone and heat-refluxed the mixture to filtrate the unsoluble polymer, followed by drying. The titled polymer (2.5 g) was obtained. The molecular weight of the polymer was measured by GPC. $M_w = 5.6 \times 10^4$ (in terms of styrene, polymeric degree (P)=about 85). The IR spectrum of the product is shown in FIG. 11.

EXAMPLE 6

A coating composition comprising 10 parts of a zirconium compound Orgatics ZC540 produced by Matsumoto Seiyaku K.K., 1 part of a silane compound A1110 produced by Nippon Unicar Co., Ltd., 40 part of 2-propanol, and 20 parts of butanol was applied to an aluminum support by dip coating and dried at 150° C. for 10 minutes to form a 0.5 μm thick subbing layer.

One part of CG-1 was mixed with 1 part of a polyvinyl butyral resin Es-Lec BM-S produced by Sukisui Chemical Co., Ltd., and 100 parts of n-butyl acetate. The mixture was dispersed together with glass beads in a paint shaker for 1 hour. The resulting coating composition was applied onto the subbing layer by dip coating and dried at 100° C. for 10 minutes to form a charge generating layer.

In 1.5 parts of monochlorobenzene was dissolved 0.2 part of charge transporting polymer (5). The resulting coating composition was applied to the charge generating layer by wire bar coating and dried at 120° C. for 1 hour to form a 15 μm thick charge transporting layer.

The resulting electrophotographic photoreceptor was evaluated as followed by use of an electrostatic paper analyzer EPA-8100 manufactured by Kawaguchi Denki K.K.

The photoreceptor was charged by a corona discharge to −6 kV under an ambient temperature and ambient humidity condition (20° C., 40% RH) and exposed to monochromatic light of 800 nm isolated from the light of a tungsten lamp by a monochromator so as to give energy of 1 μW/cm$^2$ on the surface of the photoreceptor. The initial surface potential $V_0$ (V) and the half-decay exposure $E_{1/2}$ (erg/cm$^2$) (energy required for reducing the surface potential by half) were measured. Thereafter, the photoreceptor was irradiated with white light of 10 lux for 1 second, and the residual potential $V_{RP}$ (V) was measured. The same measurement was made after repeating the above-described charging and exposure 1000 times, and the changes $\Delta V_0$, $\Delta E_{1/2}$ and $\Delta V_{RP}$ were obtained as indications of performance stability and durability. The results obtained are shown in Table 2 below.

EXAMPLES 7 TO 17

Electrophotographic photoreceptors were prepared and evaluated in the same manner as in Example 6, except for using the charge generating materials and charge transporting materials shown in Table 2 below. The results of evaluation are shown in the Table.

EXAMPLE 18

An electrophotographic photoreceptor was prepared and evaluated in the same manner as in Example 5, except for replacing charge transporting polymer (5) used in Example 5 with 0.12 part of charge transporting polymer (4) and 0.08 part of a binder resin comprising a repeating unit represented by formula (VI). The results of evaluation are shown in Table 2.

COMPARATIVE EXAMPLE 1

An electrophotographic photoreceptor was prepared and evaluated in the same manner as in Example 5, except for replacing charge transporting polymer (5) used in Example 5 with 0.2 part of polyvinylcarbazole (PVK) and replacing charge generating material CG-1 with CG-2. The results of evaluation are shown in Table 2.

TABLE 2

| Example No. | Charge Transporting Material | Charge Generating Material | Electrophotographic Characteristics | | | | | | Stability | Durability | |
|---|---|---|---|---|---|---|---|---|---|---|---|
| | | | Initial | | | After Running Test | | | | | |
| | | | $V_0$ (V) | $E_{1/2}$ (erg/cm$^2$) | $V_{RP}$ (V) | $V_0$ (V) | $E_{1/2}$ (erg/cm$^2$) | $V_{RP}$ (V) | $\Delta E_{1/2}$ (V) | $\Delta V_0$ (V) | $\Delta V_{RP}$ (V) |
| Example 6 | 5 | CG-1 | −828 | 2.5 | −31 | −810 | 3.0 | −45 | 0.5 | 18 | 14 |
| Example 7 | 6 | CG-2 | −814 | 3.0 | −24 | −799 | 3.6 | −39 | 0.6 | 15 | 15 |
| Example 8 | 9 | CG-4 | −833 | 1.3 | −18 | −800 | 1.6 | −29 | 0.3 | 13 | 11 |
| Example 9 | 15 | CG-1 | −818 | 2.6 | −28 | −801 | 3.1 | −45 | 0.5 | 17 | 17 |
| Example 10 | 20 | CG-3 | −826 | 2.1 | −37 | −810 | 2.3 | −49 | 0.2 | 16 | 12 |
| Example 11 | 29 | CG-1 | −822 | 2.6 | −30 | −803 | 3.2 | −46 | 0.6 | 19 | 16 |
| Example 12 | 30 | CG-2 | −811 | 3.1 | −25 | −797 | 3.7 | −39 | 0.6 | 14 | 14 |
| Example 13 | 41 | CG-3 | −819 | 2.0 | −40 | −801 | 2.3 | −57 | 0.3 | 18 | 17 |
| Example 14 | 46 | CG-4 | −827 | 1.2 | −16 | −815 | 1.6 | −28 | 0.4 | 12 | 12 |
| Example 15 | 48 | CG-2 | −809 | 3.2 | −24 | −794 | 3.7 | −39 | 0.5 | 15 | 15 |
| Example 16 | 55 | CG-3 | −820 | 2.2 | −39 | −804 | 2.5 | −55 | 0.3 | 16 | 16 |
| Example 17 | 87 | CG-2 | −810 | 2.8 | −25 | −794 | 3.3 | −40 | 0.5 | 16 | 15 |
| Example 18 | 4 + (VI) | CG-1 | −827 | 2.6 | −30 | −807 | 3.1 | −45 | 0.5 | 20 | 15 |
| Compar. Example 1 | PVK | CG-2 | −830 | 3.5 | −47 | −805 | 4.2 | −74 | 0.7 | 25 | 27 |

While the invention has been described in detail and with reference to specific embodiments thereof, it will be apparent to one skilled in the art that various changes and modifications can be made therein without departing from the spirit and scope thereof.

What is claimed is:

1. An organic electronic device containing in a charge transporting layer thereof a charge transporting polymer represented by formula (I):

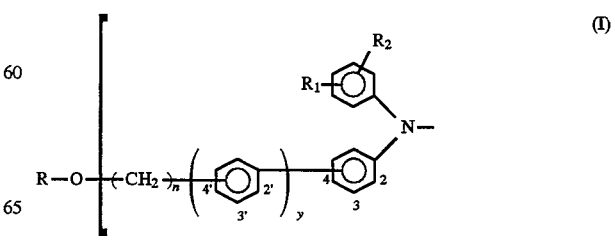

-continued

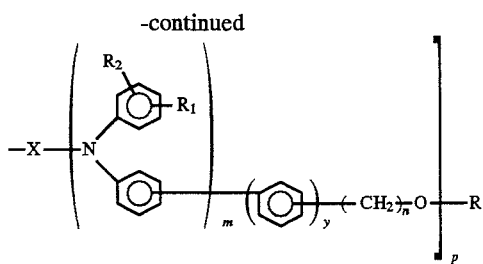

wherein R represents a hydrogen atom, an alkyl group, an acyl group or —CONH—R' wherein R' represents an alkyl group or a substituted or unsubstituted aryl group; $R_1$ and $R_2$, which may be the same or different, each represent a hydrogen atom, an alkyl group, an alkoxy group, a substituted amino group, a halogen atom, or a substituted or unsubstituted aryl group; X represents a substituted or unsubstituted divalent aromatic group; y represents 0 or 1; m represents 0 or 1; n represents an integer of 1 to 5; and p represents an integer of 5 to 5000.

2. An organic electronic device according to claim 1, wherein said organic electronic device is an electrophotographic photoreceptor having a photosensitive layer, in which said photosensitive layer contains at least one said charge transporting polymer as a charge transporting material and at least one charge generating material selected from halogenogallium phthalocyanine, halogenotin phthalocyanine, hydroxygallium phthalocyanine, titanyl phthalocyanine and oxytitanyl phthalocyanine.

* * * * *